US008693588B2

(12) United States Patent
McCloud et al.

(10) Patent No.: US 8,693,588 B2
(45) Date of Patent: Apr. 8, 2014

(54) TWO-STEP JOINT DEMAPPING ALGORITHM FOR LLR COMPUTATION OF MIMO SIGNAL BASED ON SPHERE DECODING

(75) Inventors: Michael L. McCloud, San Diego, CA (US); Dung Ngoc Doan, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 13/171,915

(22) Filed: Jun. 29, 2011

(65) Prior Publication Data

US 2012/0219097 A1 Aug. 30, 2012

Related U.S. Application Data

(60) Provisional application No. 61/446,120, filed on Feb. 24, 2011.

(51) Int. Cl.
*H03D 1/04* (2006.01)
(52) U.S. Cl.
USPC .......................................................... 375/341
(58) Field of Classification Search
USPC .................... 375/340, 341, 346, 347, 349
See application file for complete search history.

(56) References Cited

U.S. PATENT DOCUMENTS

| 6,760,390 B1* | 7/2004 | Desai et al. .................... 375/341 |
| 7,593,489 B2 | 9/2009 | Koshy et al. |
| 7,817,740 B2 | 10/2010 | Su et al. |
| 8,401,127 B1* | 3/2013 | Lee et al. ....................... 375/341 |
| 2007/0070932 A1 | 3/2007 | Doron et al. |
| 2007/0198719 A1 | 8/2007 | Su et al. |
| 2007/0260959 A1 | 11/2007 | Sidi et al. |
| 2009/0141835 A1 | 6/2009 | Yang et al. |
| 2010/0008441 A1 | 1/2010 | Murakami et al. |
| 2011/0051860 A1 | 3/2011 | Tang et al. |

OTHER PUBLICATIONS

Xiao-Feng, Qui, et al.,"A Lattice-Reduction-Aided Soft Demapper for High-Rate Coded MIMO-OFDM System," IEEE Signal Processing Letters, IEEE Service Center, Piscataway, NJ, US vol. 14, No. 5 (May 2007), pp. 305-308.

(Continued)

*Primary Examiner* — Kevin Kim
(74) *Attorney, Agent, or Firm* — Patterson & Sheridan, L.L.P.

(57) ABSTRACT

Certain aspects of the present disclosure relate to a technique for two-step joint demapping based on sphere decoding for log-likelihood ratio (LLR) computation related to a received multiple-input multiple-output (MIMO) signal. The first step of the proposed algorithm comprises a linear minimum mean square error (LMMSE) based detection to form soft symbol estimates of symbols being transmitted. Then, the LMMSE-based soft symbol estimates can be utilized to form a set of constellation points of a stream interfering to a stream of interest. These candidate constellation points can be then subtracted (canceled) from the received signal to improve the LLR computations of the stream of interest. After the cancellation, the maximum ratio combining (MRC) can be applied to each individual stream to form more refined soft symbol estimates as well as an effective signal-to-noise ratio (SNR) estimate. The refined outputs of the MRC can be utilized to compute LLRs of transmitted bits based on the effective SNR and the refined soft symbol estimates associated with all the candidate constellation points from the set. The LLRs of transmitted bits may be employed by a channel decoder.

68 Claims, 12 Drawing Sheets

(56) References Cited

OTHER PUBLICATIONS

Bittner, Stefan., et al., "Low Complexity Soft Interference Cancellation for MIMO-Systems," 2006 IEEE 63rd Vehicular Technology Conference: Melbourne, Australia (May 7-10, 2006), IEEE Operations Center, Piscataway, NJ, US (May 7, 2006), pp. 1993-1997.

Zimmerman, Ernesto, et al.,"Adaptive vs. Hybrid Iterative MIMO Receivers Based on MMSE Linear and Soft-SIC Detection," Personal, Indoor and Mobile Radio Communications (2006) IEEE 17th International Symposium on IEEE, P1, (Sep. 1, 2006), pp. 1-5.

PCT Search Report and Written Opinion for PCT/US2011/042677, dated Oct. 25, 2011.

J.C. Kothy, et al. "A New Low-Complexity Demapper for High-Performance Iterative MIMO: information-theoretic and BER Analysis," IEEE International Conference on Acoustics, Speech and Signal Processing (ICASSP), Mar. 2005.

Koshy, et al., "A new low-complexity demapper for high-performance iterative MIMO: information-theoretic and BER analyses", IEEE International Conference on Acoustics, Speech, and Signal Processing, Mar. 18-23, 2005. Proceedings. (ICASSP '05). vol. 3, pp. 1029-1032.

* cited by examiner

TWO-STEP JOINT DEMAPPING ALGORITHM FOR LLR COMPUTATION OF MIMO SIGNAL BASED ON SPHERE DECODING

CLAIM OF PRIORITY UNDER 35 U.S.C. §119

The present Application for patent claims benefit of U.S. Provisional Patent Application Ser. No. 61/446,120, entitled, "TWO-STEP JOINT DEMAPPING ALGORITHM FOR LLR COMPUTATION OF MIMO SIGNAL BASED ON SPHERE DECODING", filed Feb. 24, 2011, and assigned to the assignee hereof and hereby expressly incorporated by reference herein.

BACKGROUND

1. Field

Certain aspects of the present disclosure generally relate to wireless communications and, more particularly, to a two-step joint demapping algorithm for log-likelihood ratio (LLR) computation of multiple-input multiple-output (MIMO) signal based on sphere decoding.

2. Background

In a transmitter of all modern wireless communication links, an output sequence of bits from an error correcting code can be mapped onto a sequence of complex modulation symbols. These symbols can be then used to create a waveform suitable for transmission across a wireless channel. In general, the symbols can be mapped to various transmit locations in frequency, time, and space. One of the receiver tasks can be to make inferences about the encoder output sequence based on the received symbols, which are generally corrupted by noise and scaled by a (known) complex channel. When the transmit symbols couple in the transmission, as generally occurs when multiple transmit antennas are used to transmit independent spatial streams over identical time/frequency locations, this demapping operation is generally required to account for all of the interfering streams when making (soft) decisions about a stream of interest. This represents the general framework for joint demapping, which is specialized in the present disclosure to a few particular low complexity realizations.

SUMMARY

Certain aspects of the present disclosure provide a method for wireless communications. The method generally includes receiving a signal originating from at least two streams of modulation symbols transmitted from an apparatus, processing the signal to obtain soft symbol estimates and signal-to-noise ratio (SNR) estimates for the at least two streams, determining a set of candidate constellation points for a first of the at least two streams based on one of the soft symbol estimates for the first stream and one of the SNR estimates for the first stream, cancelling each of the candidate constellation points from the received signal to obtain an updated received signal for each candidate constellation point from the set, determining, for each of the candidate constellation points, a refined soft symbol estimate and an effective SNR for a second of the at least two streams based at least on the updated received signal and the SNR estimates, and computing a log-likelihood ratio (LLR) for a bit of the second stream based at least on the effective SNR and the refined soft symbol estimates associated with all the candidate constellation points from the set.

Certain aspects of the present disclosure provide an apparatus for wireless communications. The apparatus generally includes a receiver configured to receive a signal originating from at least two streams of modulation symbols transmitted from another apparatus, a first circuit configured to process the signal to obtain soft symbol estimates and signal-to-noise ratio (SNR) estimates for the at least two streams, a second circuit configured to determine a set of candidate constellation points for a first of the at least two streams based on one of the soft symbol estimates for the first stream and one of the SNR estimates for the first stream, a third circuit configured to cancel each of the candidate constellation points from the received signal to obtain an updated received signal for each candidate constellation point from the set, a fourth circuit configured to determine, for each of the candidate constellation points, a refined soft symbol estimate and an effective SNR for a second of the at least two streams based at least on the updated received signal and the SNR estimates, and a fifth circuit configured to compute a log-likelihood ratio (LLR) for a bit of the second stream based at least on the effective SNR and the refined soft symbol estimates associated with all the candidate constellation points from the set.

Certain aspects of the present disclosure provide an apparatus for wireless communications. The apparatus generally includes means for receiving a signal originating from at least two streams of modulation symbols transmitted from another apparatus, means for processing the signal to obtain soft symbol estimates and signal-to-noise ratio (SNR) estimates for the at least two streams, means for determining a set of candidate constellation points for a first of the at least two streams based on one of the soft symbol estimates for the first stream and one of the SNR estimates for the first stream, means for cancelling each of the candidate constellation points from the received signal to obtain an updated received signal for each candidate constellation point from the set, means for determining, for each of the candidate constellation points, a refined soft symbol estimate and an effective SNR for a second of the at least two streams based at least on the updated received signal and the SNR estimates, and means for computing a log-likelihood ratio (LLR) for a bit of the second stream based at least on the effective SNR and the refined soft symbol estimates associated with all the candidate constellation points from the set.

Certain aspects of the present disclosure provide a computer program product for wireless communications. The computer program product generally includes a computer-readable medium comprising code for receiving a signal originating from at least two streams of modulation symbols transmitted from an apparatus, processing the signal to obtain soft symbol estimates and signal-to-noise ratio (SNR) estimates for the at least two streams, determining a set of candidate constellation points for a first of the at least two streams based on one of the soft symbol estimates for the first stream and one of the SNR estimates for the first stream, cancelling each of the candidate constellation points from the received signal to obtain an updated received signal for each candidate constellation point from the set, determining, for each of the candidate constellation points, a refined soft symbol estimate and an effective SNR for a second of the at least two streams based at least on the updated received signal and the SNR estimates, and computing a log-likelihood ratio (LLR) for a bit of the second stream based at least on the effective SNR and the refined soft symbol estimates associated with all the candidate constellation points from the set.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
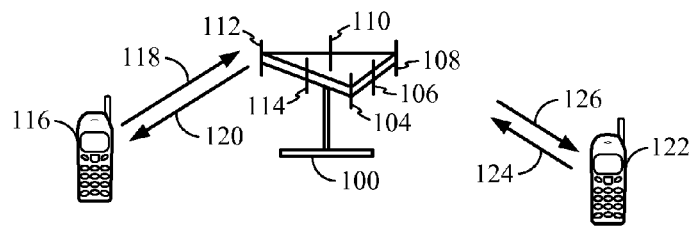
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Orthogonal Frequency Division Multiplexing (OFDM) networks, Time Division Multiple Access (TDMA) networks, Frequency Division Multiple Access (FDMA) networks, Orthogonal FDMA (OFDMA) networks, Single-Carrier FDMA (SC-FDMA) networks, Code Division Multiple Access (CDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (e.g., WiMAX (Worldwide Interoperability for Microwave Access)), IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE and LTE-A.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium.

Referring to FIG. 1, a multiple access wireless communication system according to one aspect is illustrated. In an aspect of the present disclosure, the wireless communication system from FIG. 1 may be a wireless mobile broadband system based on Orthogonal Frequency Division Multiplexing (OFDM). An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122.

Also, an access point using beamforming to transmit to access terminals scattered randomly through its coverage causes less interference to access terminals in neighboring cells than an access point transmitting through a single antenna to all its access terminals.

Certain aspects of the present disclosure support a two-step joint de-mapping algorithm for determining log-likelihood ratio (LLR) of bits associated with a received multiple-input multiple-output (MIMO) signal. The first step of the proposed detection algorithm may comprise applying a linear minimum mean square error (LMMSE) based estimation to form soft symbol estimates of symbols being transmitted. The next step may comprise utilization of the LMMSE-based soft symbol estimates to form a set of constellation points of a stream interfering to a stream of interest. These candidate constellation points may be then subtracted from the received MIMO signal in order to improve computations of bit LLRs associated with the stream of interest. In one aspect of the present disclosure, the proposed two-step de-mapping algorithm may be performed at the access terminals 116, 122 from FIG. 1. In another aspect, the proposed algorithm may be performed at the access point 100.

Figure 2:
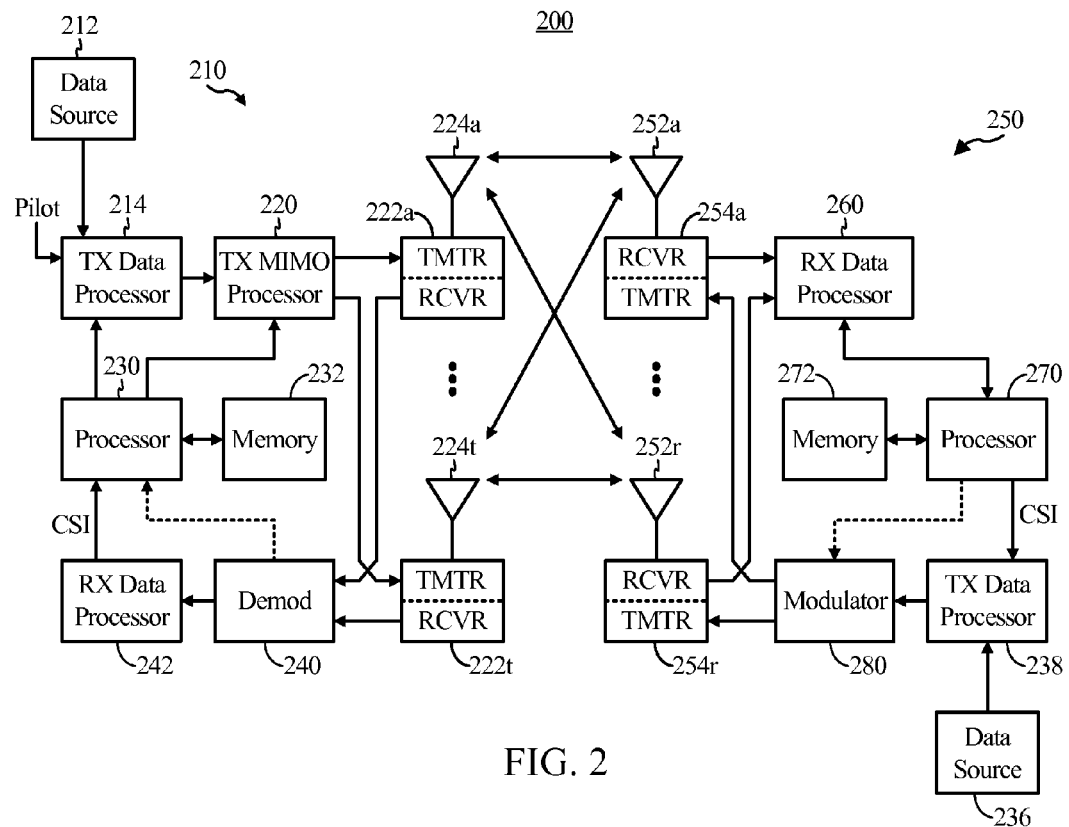
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In one aspect of the present disclosure, the aforementioned two-step joint de-mapping algorithm for computing bit LLRs based on LMMSE detection and sphere decoding may be performed at the transmitter system 210, e.g., at the processor 230. In another aspect, the proposed two-step de-mapping algorithm may be performed at the receiver system 250, e.g., at the processor 270.

Figure 3:
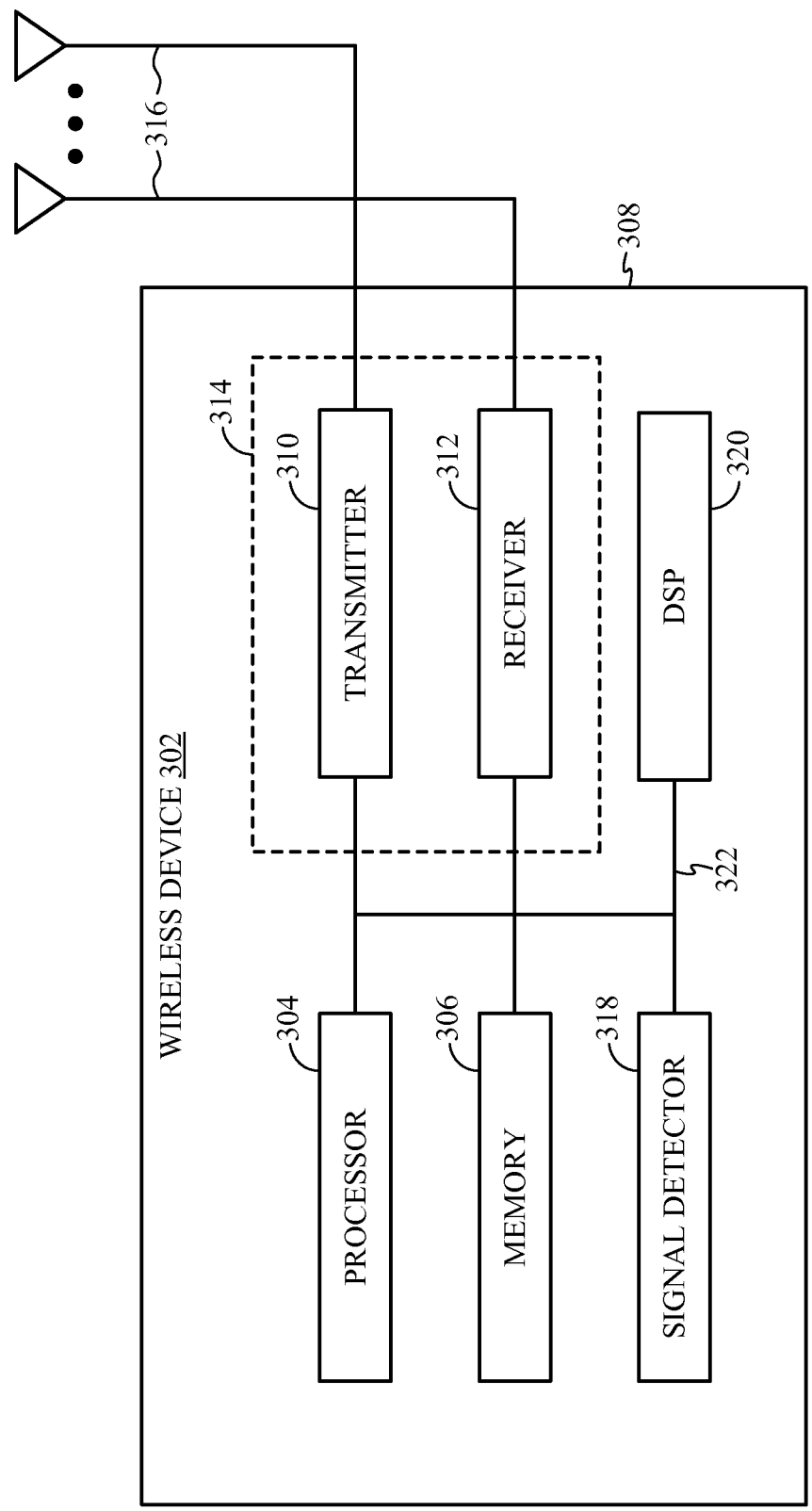
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

According to certain aspects of the present disclosure, the aforementioned two-step joint de-mapping algorithm for computing bit LLRs based on LMMSE detection and sphere decoding may be performed at the wireless device 302, e.g., at the processor 304. In one aspect, the wireless device 302 may operate as an access terminal. In another aspect, the wireless device 302 may operate as a base station.

The various components of the wireless device 302 may be coupled together by a bus system 322, which may include a power bus, a control signal bus, and a status signal bus in addition to a data bus.

Two-step Joint De-mapping Algorithm

Certain aspects of the present disclosure support a two-step joint demapping algorithm for computation of bit LLRs associated with a received MIMO signal. The first step of the proposed algorithm may comprise the LMMSE based detection to form soft symbol estimates of symbols being transmitted. The next step in the proposed approach may be to utilize the LMMSE-based soft symbol estimates to form a set of constellation points of a stream interfering to a stream of interest. These candidate constellation points may be then subtracted from the received signal in order to improve computation of bit LLRs of the stream of interest, and so forth. In particular, one can form effective constellations of a fixed size to replace the size-M QAM constellation. Namely, given the LMMSE derived soft symbol estimates, one can form a size M'≤M restricted constellation for each layer by keeping those M' constellation points that minimize the Euclidean distances. These restricted constellation points may be used in the cancelation step.

After the cancellation, the maximum ratio combining (MRC) may be applied to each individual stream to form more refined soft symbol estimates as well as an effective signal-to-noise ratio (SNR) estimate. The refined outputs of the MRC may be used to compute LLRs, which may be converted back to probabilities. The combining of more than M' candidates may be performed in the probability domain, whose weights may represent candidates' priors. The present disclosure also introduces efficient techniques for candidate searching, refined MRC, output SNR computation, calculation of candidates' priors, and so on. Approximations to the complexity-heavy computations in the sphere decoder are also presented. Performance results of sphere decoder show that the sphere decoder may offer gain of approximately 1 dB over the classic LMMSE, and it can outperform a more complex max log maximum a posteriori (MAP) detector. It should be also noted that the proposed sphere decoder may approach optimal MAP performance when the sphere size increases.

System Model

Per resource block (e.g., Orthogonal Frequency Division Multiplex (OFDM) tone), a vector representing the demodulator output may be formed as:

$$y = Hx + n, \quad (1)$$

where $$y = \begin{bmatrix} y_0 \\ y_1 \end{bmatrix} \in C^{2 \times 1}$$

is the output of the demodulation processing engine, $H=[h_0\ h_1] \in C^{2 \times 2}$ is the equivalent channel model, $$x = \begin{bmatrix} x_0 \\ x_1 \end{bmatrix} \in Q_0 \times Q_1$$

is a vector of modulation symbols, and $n \in C^{2 \times 1}$ is a vector of i.i.d. white Gaussian noise with unit variance. In the following, it can be assumed that $Q_0 = Q_1$ and that each modulation symbol is 64-QAM symbol.

For the 64-QAM constellation, each symbol $x_k$ may be formed from a mapping of six input bits, i.e., $$x_k = M(\{b_{k,0}, \ldots, b_{k,5}\}), b_{k,l} \in \{0,1\}, M: \{0,1\}^6 \to C. \quad (2)$$

A de-mapping engine may process the receive vector y to form soft decisions on the underlying bits $b_{k,l}$ for use in the binary decoder. In particular, it may be required to calculate (an approximation to) 12 LLRs:

$$\begin{aligned}
LLR_{k,l} &= \log\left\{\frac{P(b_{k,l}=1\mid y)}{P(b_{k,l}=0\mid y)}\right\} \quad (3)\\
&= \log\{P(b_{k,l}=1\mid y)\} - \log\{P(b_{k,l}=0\mid y)\}\\
&= \log\left\{\sum_{\{b_{0,0},\ldots,b_{1,5}\}:b_{k,l}=1} P(\{b_{0,0},\ldots,b_{1,5}\})\right.\\
&\quad \left. P\left(y\mid x = \begin{bmatrix} G(\{b_{0,0},\ldots,b_{0,5}\}) \\ G(\{b_{1,0},\ldots,b_{1,5}\}) \end{bmatrix}\right)\right\} -\\
&\quad \log\left\{\sum_{\{b'_{0,0},\ldots,b'_{1,5}\}:b'_{k,l}=0} P(\{b'_{0,0},\ldots,b'_{1,5}\})\right.\\
&\quad \left. P\left(y\mid x = \begin{bmatrix} G(\{b'_{0,0},\ldots,b'_{0,5}\}) \\ G(\{b'_{1,0},\ldots,b'_{1,5}\}) \end{bmatrix}\right)\right\}\\
&= \log\left\{\sum_{\{x_0 \in Q, x_1 \in Q\}:b_{k,l}=1} P(x_0)P(x_1)\frac{1}{\pi}\exp\{-\|y-Hx\|^2\}\right\} -\\
&\quad \log\left\{\sum_{\{x'_0 \in Q, x'_1 \in Q\}:b_{k,l}=0} P(x'_0)P(x'_1)\frac{1}{\pi}\exp\{-\|y-Hx'\|^2\}\right\}.
\end{aligned}$$

The receiver notion of "undoing" the mapping is to generate likelihoods for each value the constituent bits can take on, i.e., it is sought how likely it is that each bit is a zero versus a one. These likelihoods can be treated as prior probabilities within the binary decoder to generate a guess as to the input codeword (transport block, etc.). Actually, the log of the ratio of the two likelihoods may be generated, i.e., an LLR. The best that can be done given the model of received signal as a (known) linear transformation of the transmitted symbol pair plus additive white Gaussian noise is to employ the maximum a posteriori probability (MAP) rule to yield the LLR for the $l^{th}$ bit of the $k^{th}$ stream, as given by equation (3).

In short, the LLR for each bit of each symbol may be a nontrivial function of all 11 remaining bits (assuming 64-QAM on each stream in a pair of transmitted streams), requiring 2048 norms and exponent calculations per each bit of 12 total bits, which is clearly prohibitive. In order to circumvent this complexity, various approximations can be employed.

For example, the LMMSE algorithm may simplify the MAP rule by treating each stream independently, i.e., a single representative value for the interfering stream may be employed, and may be held fixed for the calculation of the LLRs for each bit of the stream of interest. Moreover, this single interference value may be chosen according to a mean square error fitting function, only using the second order statistics of the interferer (i.e., ignoring that it may come from a finite cardinality set, etc.)

On the other hand, the max-log MAP (MLM) rule may represent an approximation to the MAP algorithm, wherein the sum over 2048 terms for each of the two log terms per bit may be replaced by a single term, i.e., a hard decision may be made for each interfering bit, based on whether that bit is from the same stream or from the interfering stream. This is motivated by the usual observation that a sum of exponents of the form employed in the MAP equation may tend to be dominated by the largest term at large SNRs, and may represent the same logic behind low complexity turbo decoding, for example. Moreover, the MLM algorithm may be well suited to a type of dedicated hardware on which comparisons and additions are cheap, which may not be true for some other types of hardware, and the MLM may not be considered suitable for efficient implementation.

It should be noted that an advantage the LMMSE algorithm holds over the MLM approach can be that each LLR in a single stream may be a function of all bit values for the other bits within that stream (i.e., the full MAP equation may be used per stream), whereas in the case of MLM, hard decisions may be made even for the inter-stream terms. On the other hand, the MLM may be asymptotically optimal, and at favorable operating regimes relative to the constellation order employed may be indistinguishable from the MAP algorithm.

These differences may result in a cross-over point for any particular modulation coding scheme (MCS) pair and channel condition, i.e., an SNR below which LMMSE is better then MLM and above which the opposite is true. Since this point may vary with channel and MCS, it may actually make receiver algorithm choice difficult to predetermine, and may open any fixed selection up to degradation in some operating regimes. Taking these observations together, an approach is proposed in the present disclosure which may leverage the efficient scalar LLR engine to allow full dependencies on the inter-stream bits, and may asymptotically make hard decisions that exactly match a constellation point for the interfering stream (intra-stream LLRs), but may not use a single interfering stream estimate to avoid performance tied too closely to the uncoded symbol error rate.

Figure 4:
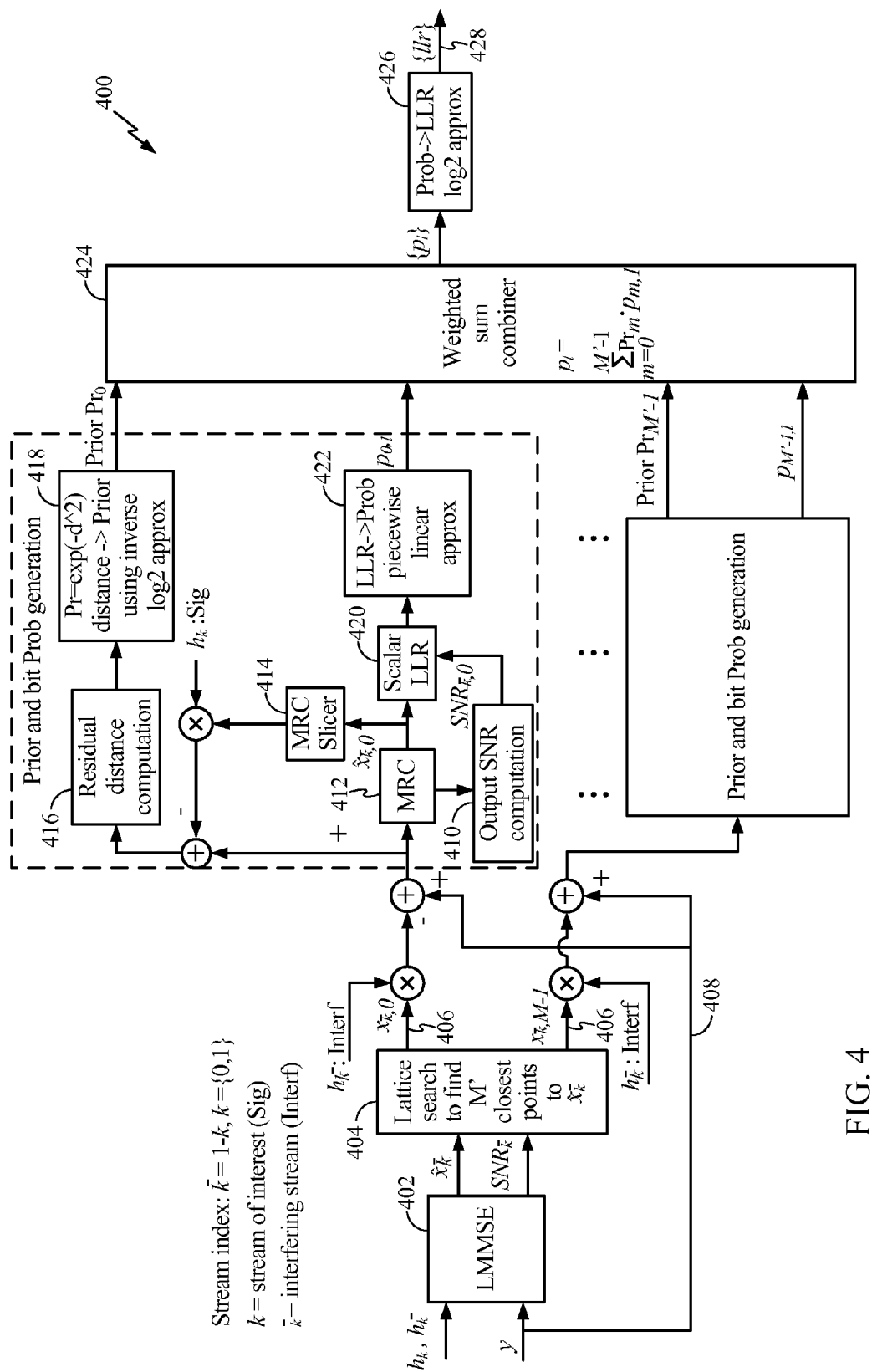
FIG. 4 illustrates an example functional blocks of a sphere decoder of the wireless device in accordance with certain aspects of the present disclosure.

FIG. 4 illustrates an example functional blocks of a proposed receiver 400 comprising two-step joint de-mapping based on LMMSE approximation and sphere decoding to compute bit LLRs being used by an outer channel decoder in accordance with certain aspects of the present disclosure.

LMMSE Approximation

The LMMSE approximation to the joint LLR computation of equation (3) performed by a block 402 of the receiver 400 may simplify computations by first decoupling the streams entirely. In particular, when calculating the LLRs composing, for example, a stream zero, a bit position independent (constant) estimate of stream one may be first subtracted from the received vector. This may allow for simultaneous independent computation of the per-stream LLRs, each of which may be performed with low complexity using the standard numerical approximations to the log-sums (e.g., based on Taylor series, etc.)

If each stream is modeled as a zero-mean complex random variable with unit power, the usual (linear) MMSE approximation to the two streams may be given through the system of equations:

$$\hat{x}_{lmmse,0} = h_0^* y - \frac{h_0^* h_1}{1 + h_1^* h_1} h_1^* y \quad (4)$$

$$\hat{x}_{lmmse,1} = h_1^* y - \frac{h_1^* h_0}{1 + h_0^* h_0} h_0^* y$$

$$SNR_{lmmse,0} = h_0^* h_0 - \frac{|h_0^* h_1|^2}{1 + h_1^* h_1}$$

$$SNR_{lmmse,1} = h_1^* h_1 - \frac{|h_0^* h_1|^2}{1 + h_0^* h_0}.$$

The equivalent model for $\hat{x}_k(0)$ may be then assumed to be $$\hat{x}_{lmmse,k} = SNR_{lmmse,k} x_k + \sqrt{SNR_{lmmse,k}} w_k, \quad (5)$$

where $w_k$ may be modeled as a zero mean, unit variance, white Gaussian noise.

Sphere Decoding and Computation of Bit LLRs

The next step in the proposed detection approach may be to utilize the LMMSE soft symbol estimates by a block 404 of the receiver 400 to form a set of constellation points 406 of the interfering stream. As illustrated in FIG. 4, these constellation points 406 may be then appropriately subtracted from a received MIMO signal 408 to improve computations of bit LLRs associated with a stream of interest.

In particular, one can form effective constellations of a fixed size to replace the QAM constellation. Namely, given the LMMSE derived soft symbol estimates $\hat{x}_{lmmse,k}$, one can form a size M'≥M restricted constellation for each layer by keeping those M' constellation points that minimize the Euclidean distances:

$$\|x_k - \hat{x}_{lmmse,k}\|. \quad (6)$$

These restricted constellation points may be then utilized in the cancelation step.

The exact formulation may be given as follows. First, the LMMSE soft symbol estimates $\hat{x}_{lmmse,0}, \hat{x}_{lmmse,1}$ may be formed, as defined by equation (4). Then, for each stream, the M' interfering stream constellation points $\{\bar{x}_{\bar{k}}\}$ with smallest Euclidian distances among all constellation points associated with a modulation of the transmitted symbols may be found, where the interfering stream is denoted by $\bar{k}=1-k$, as illustrated in FIG. 4. After this, for each interference hypothesis, the following may be formed:

$$y'_k = y - h_{\bar{k}} \bar{x}_{\bar{k}}$$

$$\hat{x}_k = v^*_k y'$$

$$v_k = h_k / (\|h_k\| \sqrt{1 + e_k(SNR_{lmmse,k})})$$

$$llr_k(l; x_{\bar{k}}) = LLR(\hat{x}_k, l)$$

$$p_k(l; x_{\bar{k}}) = 1/(1 + \exp(-llr_k(l; x_{\bar{k}})))$$

$$Pr_k(x_{\bar{k}}) = \exp(-\|y' - \bar{x}_{mrc,k} h_k\|^2), \quad (7)$$

and the output LLRs may be computed via $$p_{k,l} = \sum_{x_{\bar{k}}} Pr_k(x_{\bar{k}}) p_k(l; x_{\bar{k}}) \quad (8)$$

$$llr_{k,l} = \log\left(\frac{p_{k,l}}{1 - p_{k,l}}\right)$$

The above processing may be chosen with the goal of keeping the residual noise power equal to unity. The residual noise may comprise two terms, the original Additive Gaussian White Noise (AWGN) and the residual error $h_{\bar{k}}(x_{\bar{k}} - \bar{x}_{\bar{k}})$. In order to get a bound on the second term, the mean-squared error may be employed:

$$e_k(SNR) = E|x - \hat{x}|^2, \quad (9)$$

where $\bar{x}$ may be obtained from the model $y = \sqrt{SNR} \times x + n$. The function $e_k(SNR)$ may be obtained offline via Monte Carlo averaging, for example.

In order to gain a more insight into the proposed sphere decoding algorithm, it should be noted that the exact log-MAP LLR calculation of equation (3) may be factored as:

$$LLR_{k,l} = \log\{Pr(b_{k,l} = 1 | y)\} - \log\{1 - Pr(b_{k,l} = 1 | y)\} \quad (10)$$

$$Pr(b_{k,l} = 1 | y) = \sum_{x_{\bar{k}} \in Q} Pr(b_{k,l} = 1 | y, x_{\bar{k}}) Pr(x_{\bar{k}}).$$

Each term $Pr(b_{k,l}=1|y,x_{\bar{k}})$ may be obtained directly from the LLR associated with $y'_k = y - h_{\bar{k}} x_{\bar{k}}$, i.e., if $LLR' = LLR(y'_k)$ is the log likelihood ratio associated with bit l in the scalar model $y'_k = SNR \times x_k + \sqrt{SNR} \times n$, then:

$$Pr(b_{k,l} = 1 | y, x_{\bar{k}}) = 1/(1 + \exp(-LLR'_{k,l})). \quad (11)$$

It can be observed that the sphere decoding equations may differ from the exact joint LLR equation in two ways. First, there may be a restriction of the sum to M'≤M terms (and hence LLR calculations). Second, the computation of $Pr(x_{\bar{k}})$ may be approximated, i.e., a summation of exponentials over all M/2 values of $x_k$ for which $b_{k,l}=1$ may be replaced by a single exponential formed from the posterior estimate of $x_k$ formed from $LLR'_{k,l}$. This approximation may provide excellent performance results over a large range of SNRs.

In the following, more details are presented on the design of sphere decoder implemented at the block 404 of the receiver 400 from FIG. 4.

Finding Interfering Candidates Using Pseudo-Lattice Search

Given the LMMSE soft symbol estimates $\hat{x}_{lmmse,\bar{k}}$, one can form a size M'≤M restricted constellation for each layer by keeping those M' constellation points $x_{\bar{k},m}$ that minimize the distances:

$$\|x_{\bar{k},m} - \hat{x}_{lmmse,\bar{k}}\|, \quad (12)$$

where $\bar{k}$ is the interfering stream (or layer) index, m is the candidate index and $\hat{x}_{lmmse,\bar{k}}$ is the LMMSE soft symbol output for interfering stream $\bar{k}$.

Therefore, in order to choose a set of candidates for the interfering stream, the LMMSE output for that stream may be a starting point, and then the closest constellation points to that estimate may be sought. The "correct" way to perform this test can be to perform sorting based on Euclidian distances. However, this can be computationally expensive, as it may require up to 64 Euclidean distance calculations for 64-QAM. In order to simplify this search, the following facts can be exploited: the fact that QAM constellations are cross products of PAM (Pulse Amplitude Modulation) constellations, i.e., I and Q components can be independently mapped; and the fact that the underlying PAM constellation has a regular two-dimensional lattice structure.

To leverage these facts, hard decisions may be separately made on the I and Q constellation components. For example, for 16 candidates, four levels may be chosen for the inphase and four levels for the quadrature components from the corresponding PAM constellations in order to form all 16 possible complex pairs. Furthermore, simple rounding and saturation rules may be utilized to choose these PAM points.

First, for 64-QAM modulation, normalization of the inphase component of LMMSE output may be performed as:

$$\hat{s}_{\bar{k},I} = \sqrt{42} \cdot Re\{\hat{x}_{lmmse,\bar{k}}\}/SNR_{lmmsem,\bar{k}} = q'_{\bar{k},I} + u_{\bar{k}} \quad (13)$$

The scaled constellation point (assuming 64-QAM) may obey:

$$q'_{\bar{k},I} \in \{-7,-5,-3,-1,1,3,5,7\}. \quad (14)$$

Furthermore, for 64-QAM:

$$(q'_{\bar{k},I}-1)/2 \in \{-4,-3,-2,-1,0,1,2,3\}. \quad (15)$$

Figure 5:
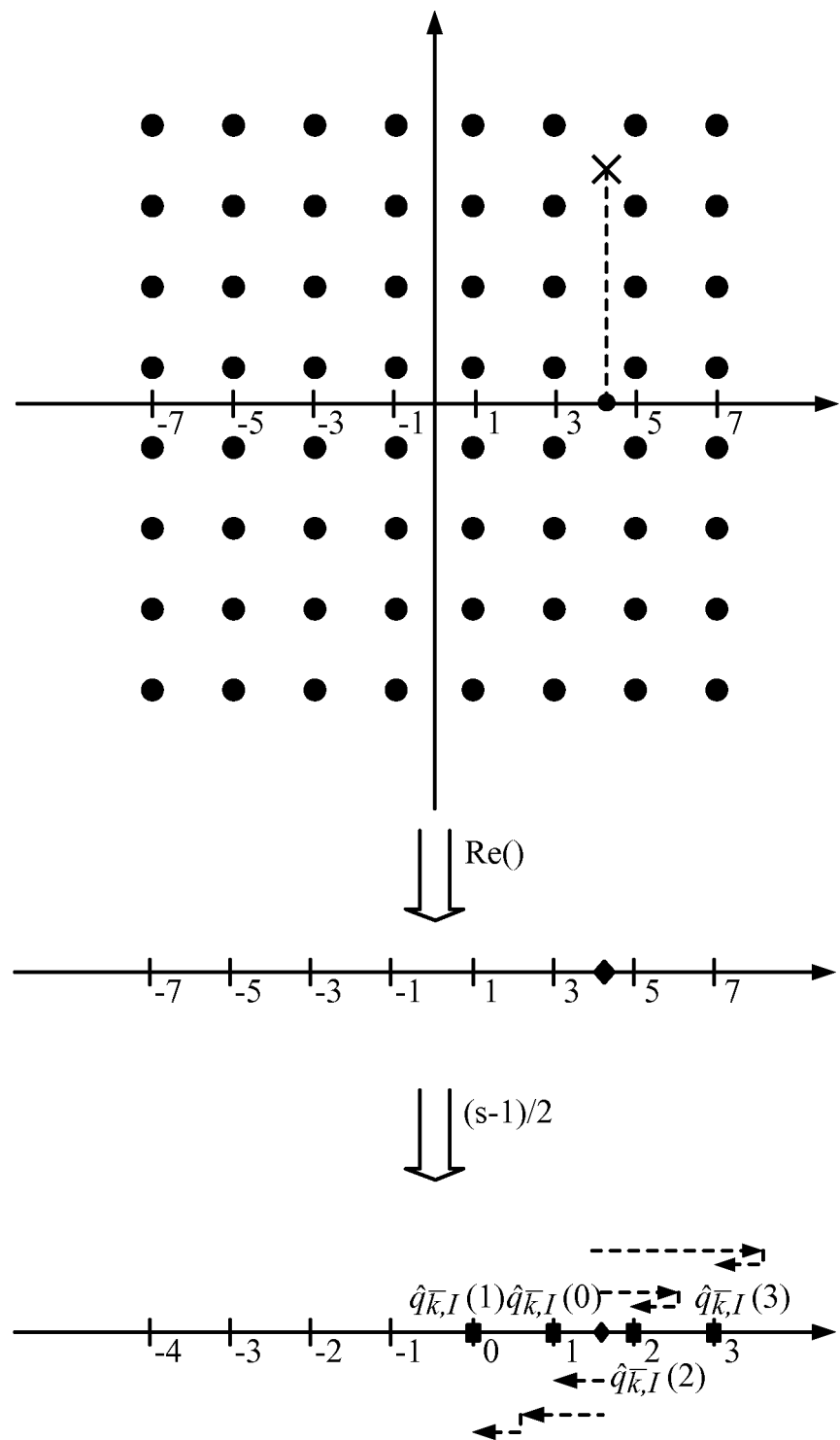
FIG. 5 illustrates an example of candidate selection in accordance with certain aspects of the present disclosure.

This may suggest that in order to obtain four estimates of the inphase component of the constellation point, the following can be formed:

$$\hat{q}_{\bar{k},I}(0) = 2 \times \lfloor (\hat{s}_{\bar{k},I}-1)/2 \rfloor_{3bit} + 1$$

$$\hat{q}_{\bar{k},I}(1) = 2 \times \lfloor (\hat{s}_{\bar{k},I}-1)/2 - 1 \rfloor_{3bit} + 1$$

$$\hat{q}_{\bar{k},I}(2) = 2 \times \lfloor (\hat{s}_{\bar{k},I}-1)/2 + 1 \rfloor_{3bit} + 1,$$

$$\hat{q}_{\bar{k},I}(3) = 2 \times \lfloor (\hat{s}_{\bar{k},I}-1)/2 + 2 \rfloor_{3bit} + 1 \quad (16)$$

where the operation $\lfloor x \rfloor_{3bits}$ denotes taking a floor and saturating the result to three bits. An example of candidate selection is illustrated in FIG. 5, where points (1, 3, 5, 7) are chosen for the inphase and points (3, 5, 7, 7) are chosen for the quadrature component (note the replication).

It should be noted that this algorithm may end up identifying repeated points, i.e., it may not be guaranteed to result in unique candidates, thereby giving higher weight to certain edge constellation points. It should also be noted that candidate repetition may only appear when either I or Q component is smaller than −4 or greater than 3. This may suggest that an improved version of the lattice search resulting in symmetry (or no candidate repetition) can be realized if the $\lfloor x \rfloor_{3bits}$ operation is applied to $\hat{s}_{\bar{k},I}$ and to $\hat{s}_{\bar{k},Q}$. The flooring of this operation may not affect the final outcomes.

The final lattice search algorithm for 16 candidates of 64-QAM may be defined by:

$$\hat{s}_{\bar{k},I} = \sqrt{42} \cdot Re\{\hat{x}_{lmmse,\bar{k}}\}/SNR_{lmmse,\bar{k}}$$

$$\hat{s}_{\bar{k},Q} = \sqrt{42} \cdot Im\{\hat{x}_{lmmse,\bar{k}}\}/SNR_{lmmse,\bar{k}}$$

$$\hat{q}_{\bar{k},I}(0) = 2 \times \lfloor (\lfloor \hat{s}_{\bar{k},I} \rfloor_{3bit}-1)/2 \rfloor_{3bit} + 1$$

$$\hat{q}_{\bar{k},I}(1) = 2 \times \lfloor (\lfloor \hat{s}_{\bar{k},I} \rfloor_{3bit}-1)/2 - 1 \rfloor_{3bit} + 1$$

$$\hat{q}_{\bar{k},I}(2) = 2 \times \lfloor (\lfloor \hat{s}_{\bar{k},I} \rfloor_{3bit}-1)/2 + 1 \rfloor_{3bit} + 1$$

$$\hat{q}_{\bar{k},I}(3) = 2 \times \lfloor (\lfloor \hat{s}_{\bar{k},I} \rfloor_{3bit}-1)/2 + 2 \rfloor_{3bit} + 1$$

$$\hat{q}_{\bar{k},Q}(0) = 2 \times \lfloor (\lfloor \hat{s}_{\bar{k},Q} \rfloor_{3bit}-1)/2 \rfloor_{3bit} + 1$$

$$\hat{q}_{\bar{k},Q}(1) = 2 \times \lfloor (\lfloor \hat{s}_{\bar{k},Q} \rfloor_{3bit}-1)/2 - 1 \rfloor_{3bit} + 1$$

$$\hat{q}_{\bar{k},Q}(2) = 2 \times \lfloor (\lfloor \hat{s}_{\bar{k},Q} \rfloor_{3bit}-1)/2 + 1 \rfloor_{3bit} + 1$$

$$\hat{q}_{\bar{k},Q}(3) = 2 \times \lfloor (\lfloor \hat{s}_{\bar{k},Q} \rfloor_{3bit}-1)/2 + 2 \rfloor_{3bit} + 1, \quad (17)$$

where $\lfloor x \rfloor_{3bit}$ stands for the 3-bit floor and saturation operation given by:

$$\lfloor x \rfloor_{3bit} = \begin{cases} -4, & \text{if } x < -4 \\ 3, & \text{if } x > 3 \\ \lfloor x \rfloor, & o.w. \end{cases} \quad (18)$$

Then, 16 candidates of 64-QAM may be formed from the set $\{\hat{q}_{\bar{k},I}\} \times j\{\hat{q}_{\bar{k},Q}\}$.

Similarly, the lattice search for four candidates of 64-QAM may be defined by:

$$\hat{s}_{\bar{k},I} = \sqrt{42} \cdot Re\{\hat{x}_{lmmse,\bar{k}}\}/SNR_{lmmse,\bar{k}}$$

$$\hat{s}_{\bar{k},Q} = \sqrt{42} \cdot Im\{\hat{x}_{lmmse,\bar{k}}\}/SNR_{lmmse,\bar{k}}$$

$$\hat{q}_{\bar{k},I}(0) = 2 \times \lfloor (\lfloor \hat{s}_{\bar{k},I} \rfloor_{[-6,5]}-1)/2 \rfloor_{3bit} + 1$$

$$\hat{q}_{\bar{k},I}(1) = 2 \times \lfloor (\lfloor \hat{s}_{\bar{k},I} \rfloor_{[-6,5]}-1)/2 + 1 \rfloor_{3bit} + 1$$

$$\hat{q}_{\bar{k},Q}(0) = 2 \times \lfloor (\lfloor \hat{s}_{\bar{k},Q} \rfloor_{[-6,5]}-1)/2 \rfloor_{3bit} + 1$$

$$\hat{q}_{\bar{k},Q}(1) = 2 \times \lfloor (\lfloor \hat{s}_{\bar{k},I} \rfloor_{[-6,5]}-1)/2 + 1 \rfloor_{3bit} + 1, \quad (19)$$

where $\lfloor x \rfloor_{[-6,5]}$ stands for the '4-bit' saturation operation given by:

$$\lfloor x \rfloor_{[-6,5]} = \begin{cases} -6, & \text{if } x < -6 \\ 5, & \text{if } x > 5 \\ \lfloor x \rfloor, & o.w. \end{cases} \quad (20)$$

It should be also noted that the floor operation may be dropped without affecting final candidate outcomes. In an aspect, four candidates of 64-QAM may be formed from the set $\{\hat{q}_{\bar{k},I}\} \times j\{\hat{q}_{\bar{k},Q}\}$.

Similarly, the lattice search for four candidates of 16-QAM may be defined by:

$$\hat{s}_{\bar{k},I} = \sqrt{10} \cdot Re\{\hat{x}_{lmmse,\bar{k}}\}/SNR_{lmmse,\bar{k}}$$

$$\hat{s}_{\bar{k},Q} = \sqrt{10} \cdot Im\{\hat{x}_{lmmse,\bar{k}}\}/SNR_{lmmse,\bar{k}}$$

$$\hat{q}_{\bar{k},I}(0) = 2 \times \lfloor (\lfloor \hat{s}_{\bar{k},I} \rfloor_{2bit}-1)/2 \rfloor_{2bit} + 1$$

$$\hat{q}_{\bar{k},I}(1) = 2 \times \lfloor (\lfloor \hat{s}_{\bar{k},I} \rfloor_{2bit}-1)/2 + 1 \rfloor_{2bit} + 1$$

$$\hat{q}_{\bar{k},Q}(0) = 2 \times \lfloor (\lfloor \hat{s}_{\bar{k},Q} \rfloor_{2bit}-1)/2 \rfloor_{2bit} + 1$$

$$\hat{q}_{\bar{k},Q}(1) = 2 \times \lfloor (\lfloor \hat{s}_{\bar{k},I} \rfloor_{2bit}-1)/2 + 1 \rfloor_{2bit} + 1, \quad (21)$$

where $\lfloor x \rfloor_{2bit}$ stands for the 2-bit floor and saturation operation:

$$\lfloor x \rfloor_{2bit} = \begin{cases} -2, & \text{if } x < -2 \\ 1, & \text{if } x > 1 \\ \lfloor x \rfloor, & o.w. \end{cases} \quad (22)$$

In aspect, four candidates of 16-QAM may be formed from the set $\{\hat{q}_{\bar{k},I}\} \times j\{\hat{q}_{\bar{k},Q}\}$ defined by equation (21).

Computation of Effective (Output) SNR

When computing the LLRs for the stream of interest under each interference hypothesis, it may be important to specify a reasonable operating SNR. For example, if one of the candidates is correct, then the actual SNR after subtraction may be simply $$SNR_{k,k'} = \|h_k\|^2. \quad (23)$$

However most of the candidates may not be correct, and simply using equation (23) for all candidates may lead to an inflation of LLR magnitudes for the incorrect hypotheses, and ultimately to performance losses (possibly worse than the baseline LMMSE). To address this problem, a notion of (average) residual error power post cancellation can be introduced in the present disclosure, i.e., after cancellation of the interfering stream, the system model may be given as:

$$y'_k = h_k s_k - h_{\bar{k}}(s_{\bar{k}}^{act} - s'_{\bar{k}}) + w_k = h_k s_k - e_k, \quad (24)$$

$$E|e_k|^2 = 1 + h^*_k h_{\bar{k}}|^2 SE(SNR_{\bar{k}}), \quad (25)$$

where $SE(SNR_{\bar{k}})$ is the average residual error power from the interfering stream as a function of the LMMSE output SNR for that stream. In an aspect, this function may be computed for various modulation orders from Monte-Carlo simulations. The following provides low level details.

In order to compute the SNR of each output symbol in the sphere decoding update (required in the LLR calculation), the squared error lookup may be first approximated. The squared error computation may be found by fitting the logarithm of the input LMMSE SNR to a fourth order polynomial with coefficients $\{q_4, q_3, q_2, q_1, q_0\}$. In an aspect, these coefficients may be functions of modulation order as well as of the number of candidates used by the sphere decoder (SD), as given in Table I.

TABLE I

| Polynomial Coef | Bitwidth | 64QAM, SD{16} | 64QAM, SD{4} | 16QAM, SD{4} |
|---|---|---|---|---|
| $2^{15}q_4$ | 16S15 | 2 | 21 | 7 |
| $2^{15}q_3$ | 16S15 | −198 | −397 | −233 |
| $2^{15}q_2$ | 16S15 | 1658 | 2985 | 2019 |
| $2^{15}q_1$ | 16S15 | −5012 | −10704 | −6800 |
| $2^{15}q_0$ | 16S15 | 5335 | 15440 | 8025 |

The input SNR may be saturated so that this fit may give the value zero for any input greater than that. The SNR saturation values may be a function of modulation order and the number of candidates used in sphere decoder, as given in Table II.

TABLE II

|  | 64QAM, SD{16} | 64QAM, SD{4} | 16QAM, SD{4} |
|---|---|---|---|
| Input SNR saturation value (linear) | 8 | 32 | 8 |
| Input SNR saturation value (dB) | 9.03 dB | 15.05 dB | 9.03 dB |

In an aspect, the SNR saturation values may be chosen such that the squared error terms reach −25 dB or lower.

The polynomial curve fitting may be defined as follows. Let $x = \log_2(SNR_{\bar{k}})$ be the input of the polynomial, then the output may be given as:

$$y = q_4 x^4 + q_3 x^3 + q_2 x^2 + q_1 x + q_0 = SE(SNR_{\bar{k}}). \quad (26)$$

In an aspect of the present disclosure, the polynomial input $x = \log_2(SNR_{\bar{k}})$ may be approximated by the integer floor of this value through the use of the count leading zeros primitive, adjusted by the normalized value after removing these MSB, i.e., mathematically given by:

$$\log_2(SNR_{\bar{k}}) \approx \lfloor \log_2(SNR_{\bar{k}}) \rfloor + \frac{SNR_{\bar{k}}}{2^{\lfloor \log_2(SNR_{\bar{k}}) \rfloor}} - 1. \quad (27)$$

Figure 6:
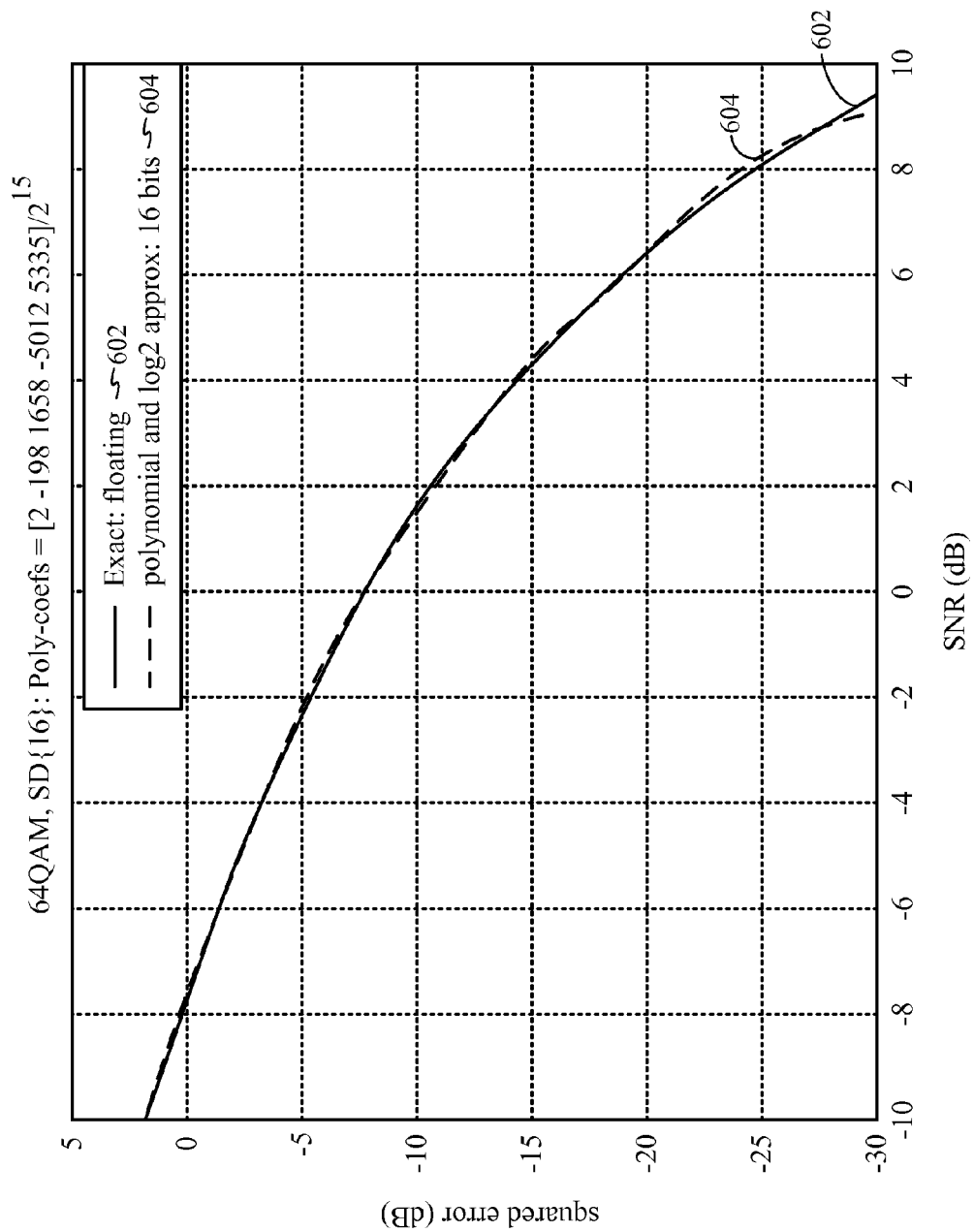
FIG. 6 illustrates an example polynomial fitting for a squared error term used for computing an effective signal-to-noise ratio (SNR) for 64-QAM and 16 sphere decoder candidates in accordance with certain aspects of the present disclosure.
Figure 7:
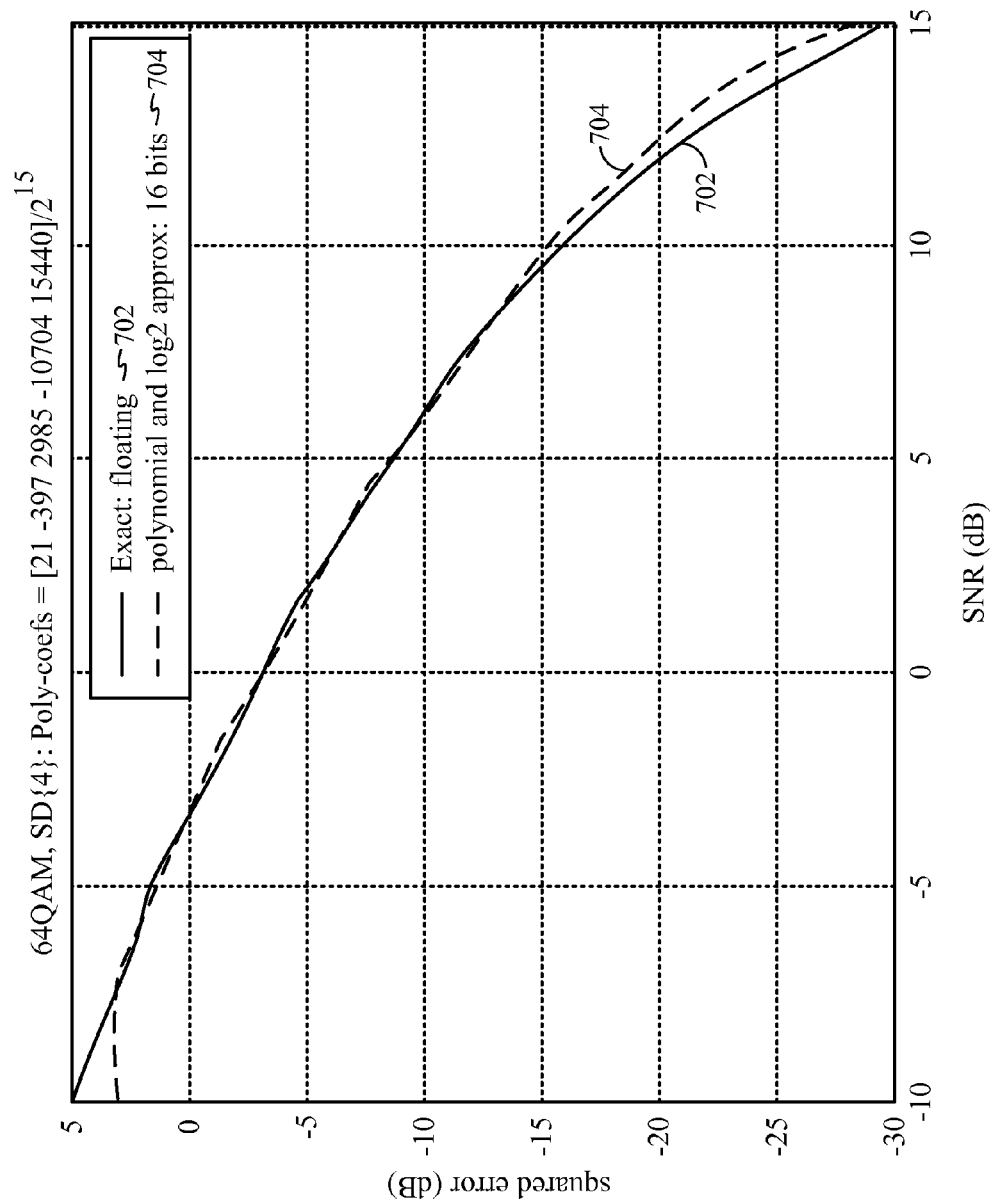
FIG. 7 illustrates an example polynomial fit for a squared error term used for computing an effective SNR for 64-QAM and four sphere decoder candidates in accordance with certain aspects of the present disclosure.
Figure 8:
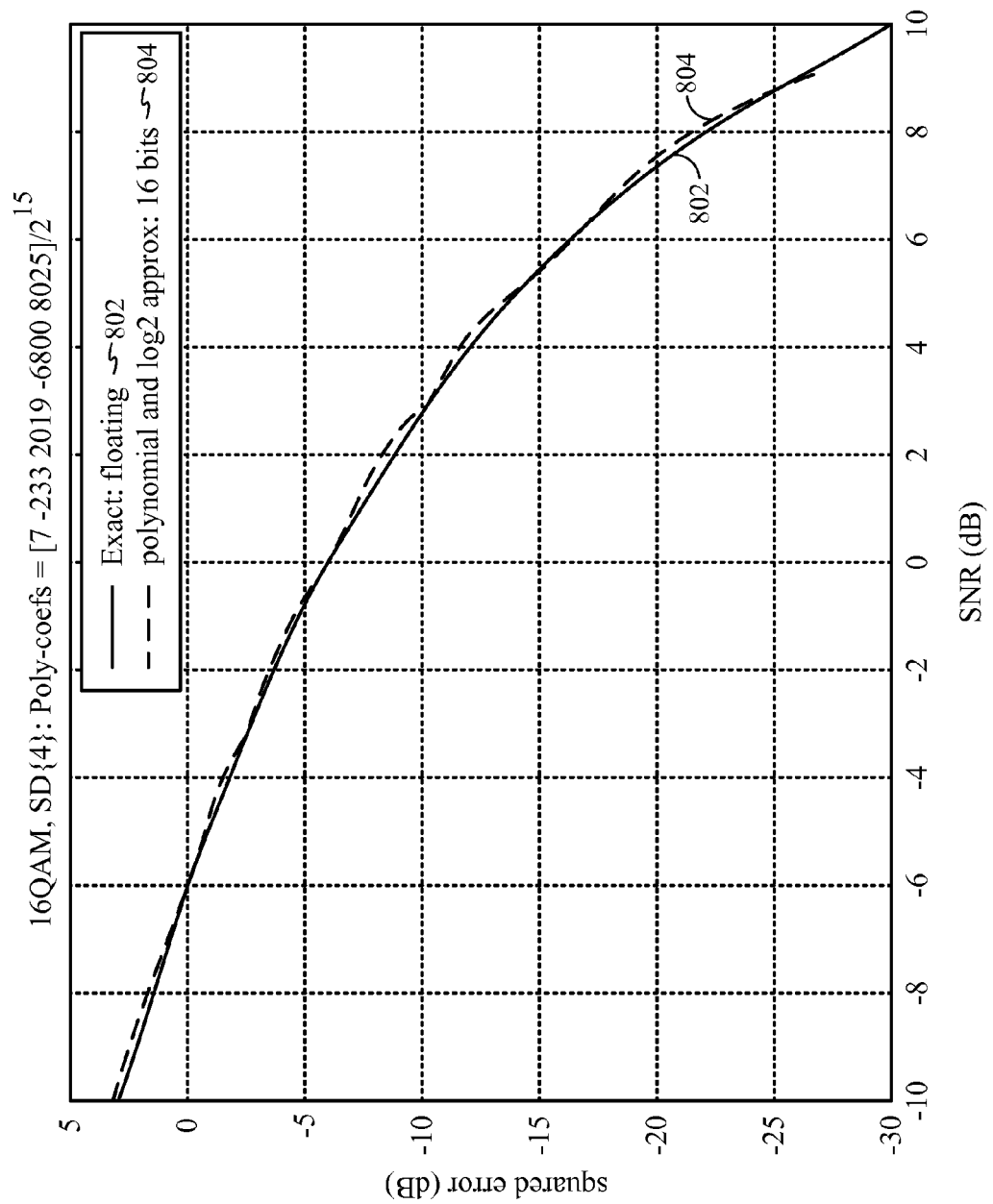
FIG. 8 illustrates an example polynomial fit for a squared error term used for computing an effective SNR for 16-QAM and four sphere decoder candidates in accordance with certain aspects of the present disclosure.

In an aspect of the present disclosure, the first and second terms in equation (20) may be returned together by the normalizing primitive, so the additional processing may be simply a real addition. The approximation is illustrated in FIGS. 6-8, where the actual squared error obtained through Monte-Carlo simulations and the polynomial approximation together with the approximation using 16 bits are illustrated. In an aspect, the squared error terms SE may have a bit-width of 16S14. It should be noted that the squared error terms may be zeros if the number of SD candidates is the same as the constellation size, i.e., they are zeros for pairs {64QAM, SD{64}}; {16QAM, SD{16}}; {QPSK, SD{4}}.

The final SNR calculation may require the computation of:

$$SNR_k^{output} = \frac{\|h_k\|^4}{\|h_k\|^2 + |\gamma|^2 SE(SNR_{\bar{k}})}, \quad (28)$$

where the terms $\|h_k\|^2$ and $|\gamma|^2 = |h^*_k h_{\bar{k}}|^2$ were already computed for the LMMSE branch. In an aspect of the present disclosure, the aforementioned calculation of output (effective) SNR may be performed for each of the M' candidates by a unit 410 of the receiver 400, as illustrated in FIG. 4.

Maximum Ratio Combining (MRC) Slicing Priors

The proposed approach for computing prior probabilities may rely on the hard decision (or slicing) of Maximum Ratio Combining (MRC) symbol of the primary stream. In an aspect, the primary stream MRC symbol may be hard-coded to the nearest mapped constellation point. The MRC slicing priors for each of M' candidates may be found as:

$$Pr_k(x_{cand,k,m}) = \exp(-\|y'_{k,m} - \bar{x}_{mrc,k,m} \cdot h_k\|^2) \quad (29)$$

$$\bar{x}_{mrc,k,m} = \underset{x \in \text{Gray mapping constellation}}{\operatorname{argmin}} |\bar{x}_{mrc,k,m} - x|,$$

where $\bar{x}_{mrc,k,m}$ is a hard-coded MRC of the primary stream that may be obtained by units 412, 414 of the receiver 400 from FIG. 4.

In order to find the hard coded MRC, it may be required to find the nearest constellation point to the soft MRC symbol of the primary stream. In an aspect, a lattice search approach may be utilized, as being done in the candidate search. In this case, the number of candidates may be four and the closest one may be kept, which may require two comparisons.

In an aspect of the present disclosure, a prior probability for each of the M' candidates may be computed by blocks 416, 418 of the receiver 400 from FIG. 4 based on a residual distance, as given by:

$$Pr_m = \exp(-d_{res,k,m}^2)$$

$$d_{res,k,m}^2 = \|y'_{k,m} - \bar{x}_{mrc,k,m} h_k\|^2. \quad (30)$$

The inverse log 2 approximation to the exp( ) function may be used. After taking natural log to both sides, the following may be obtained:

$$Pr = \exp(-d^2) \quad (31)$$

$$\log_e(Pr) = -d^2$$
$$= \frac{\log_2(Pr)}{\log_2(e)},$$

or $$\log_2(Pr) = -d^2 \log_2(e). \quad (32)$$

In an aspect, log 2 approximation may be used for $\log_2(Pr)$ to get:

$$\log_2(Pr) \approx n_{floor} + \frac{Pr}{2^{n_{floor}}} - 1, \quad (33)$$

where $$n_{floor} = \lfloor \log_2(Pr) \rfloor. \quad (34)$$

By merging equations (32), (33) and (34), the approximation for the prior probability may be finally obtained as:

$$Pr \approx [d_{inv}^2 - n_{floor} + 1] \cdot 2^{n_{floor}}, n_{floor} = \lfloor d_{inv}^2 \rfloor, d_{inv}^2 = -d^2 \cdot \log_2(e). \quad (35)$$

Figure 9:
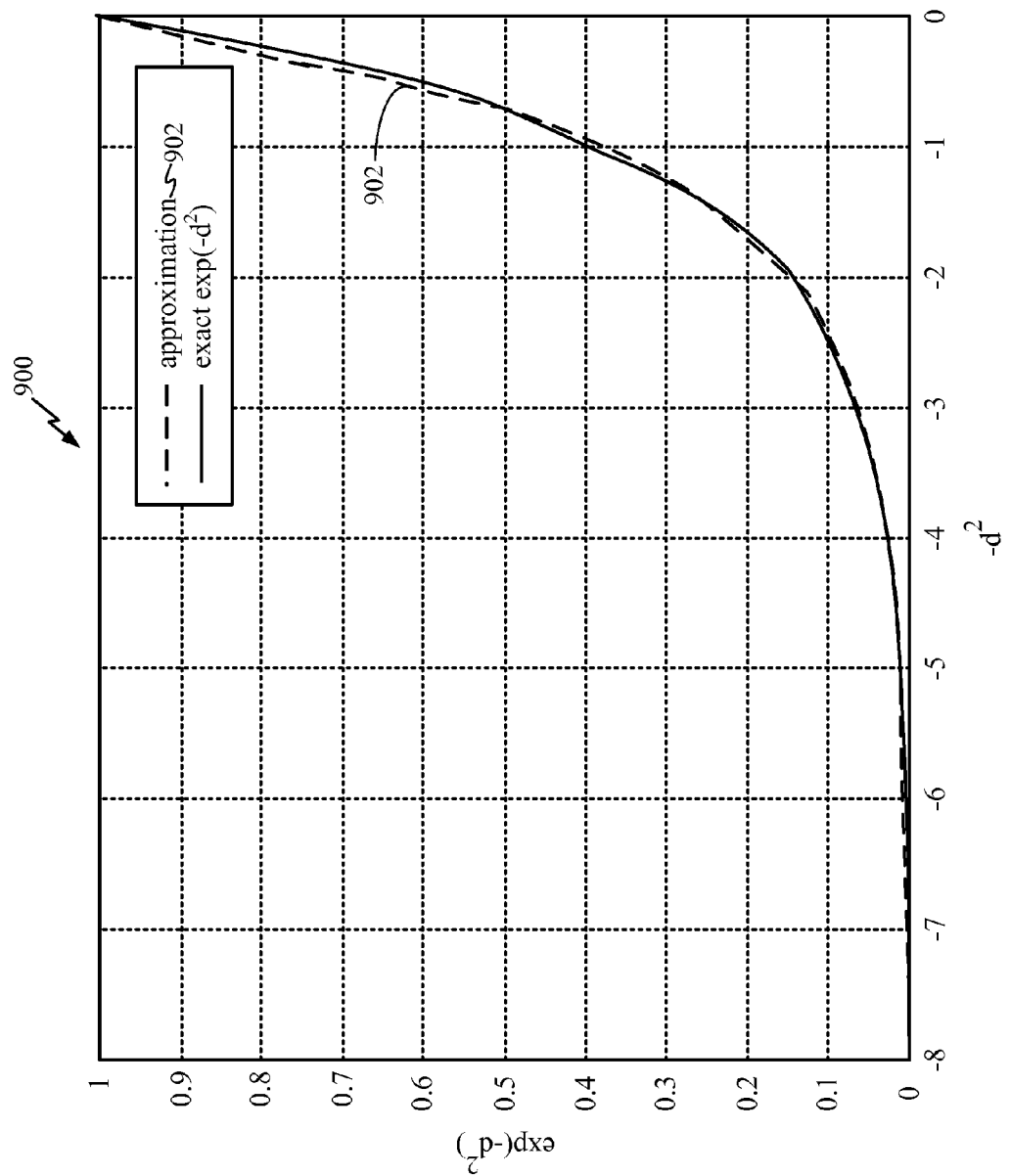
FIG. 9 illustrates an example inverse log approximation used for computing prior probabilities associated with a transmitted stream in accordance with certain aspects of the present disclosure.

FIG. 9 illustrates an example 900 of exp( ) approximation 902 using inverse log 2 in accordance with certain aspects of the present disclosure.

Distance-to-Probability Approximation Using Hard-Decision Multinomial

A similar approach to the MRC slicing is based on slicing LLR values. In an aspect of the present disclosure, the post MRC LLRs may be sliced and mapped to a QAM constellation point.

The hard-decision multi-nomial (MLN)-based priors may be found as:

$$Pr(\bar{s}_{cand,\bar{k},m}) = \exp(-\|y'_{k,m} - s_{k,m}^{MLN} h_k\|), \quad (36)$$

where $\bar{s}_{k,m}^{MLN} = M(\{b_l\})$=constellation mapping, $b_l \in \{0,1\}$, $l=0, 1, 2, \ldots, \log_2(M)$, M is a constellation size, and $$b_l = \begin{cases} 1, & llr_k(l; \bar{s}_{cand,\bar{k},m}) > 0 \\ 0, & \text{otherwise.} \end{cases} \quad (37)$$

Converting Log Likelihood Ratio to Bit-Probability

Once the bit LLRs for all candidates are computed from LLR blocks (e.g., scalar LLR blocks 420 of the receiver 400 from FIG. 4), the bit probabilities may be required for final LLR computation. In one aspect of the present disclosure, the piecewise linear approximation may be utilized by a block 422 (i.e., one block 422 for each candidate) to convert an LLR to a bit probability, as given by:

$$p = \frac{1}{1 + \exp(-llr)} \quad (38)$$

$$\approx \begin{cases} f_{piecewise}(llr), & 0 \leq llr \\ 1 - f_{piecewise}(-llr), & 0 > llr \end{cases}$$

$$f_{piecewise}(llr) = llr \cdot a_{idx} + b_{idx},$$

-continued $$idx = n \text{ if } \overline{llr}_{n-1} < llr_{in} \leq \overline{llr}_n$$

$$n = 0, 1, \ldots, N - 1$$

$$\overline{llr}_n = \text{input break points},$$

where N−1 represents a number of segments used in the approximation, and $\overline{llr}_{N-1}$ is an LLR threshold. If the input LLR is greater than the LLR threshold, then the output probability may be saturated at the value of one.

Figure 10:
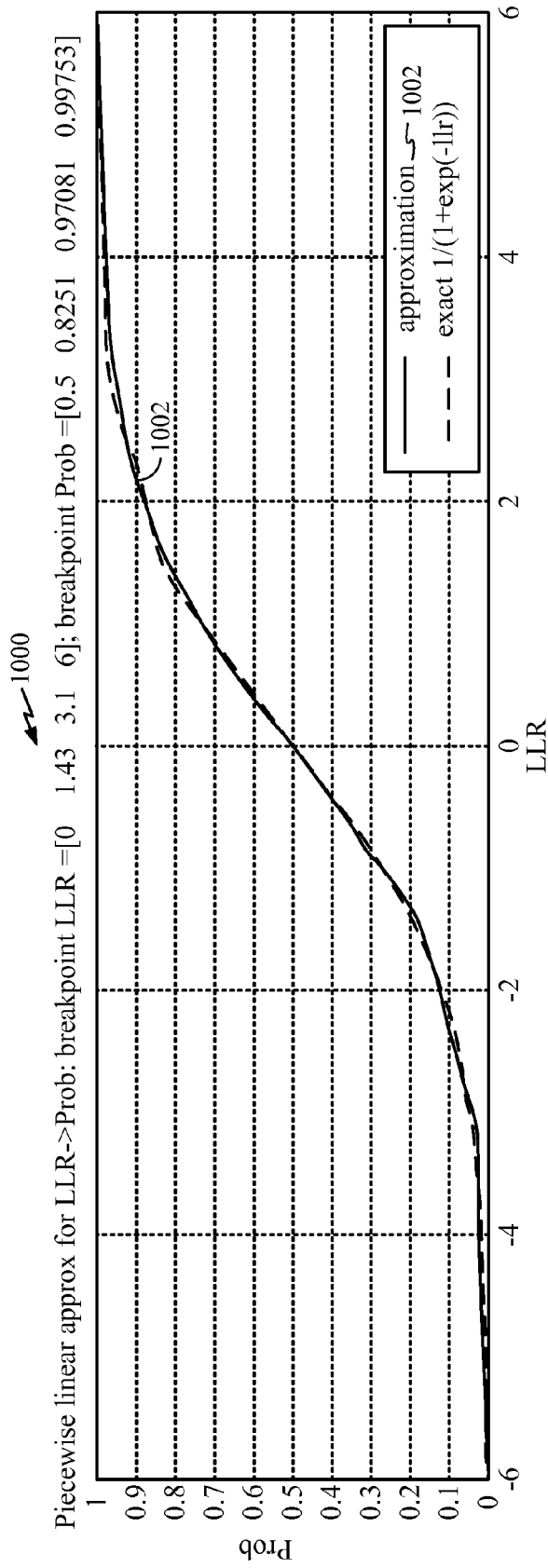
FIG. 10 illustrates an example piecewise linear approximation for converting a log-likelihood ratio (LLR) into a bit probability in accordance with certain aspects of the present disclosure.
Figure 10:
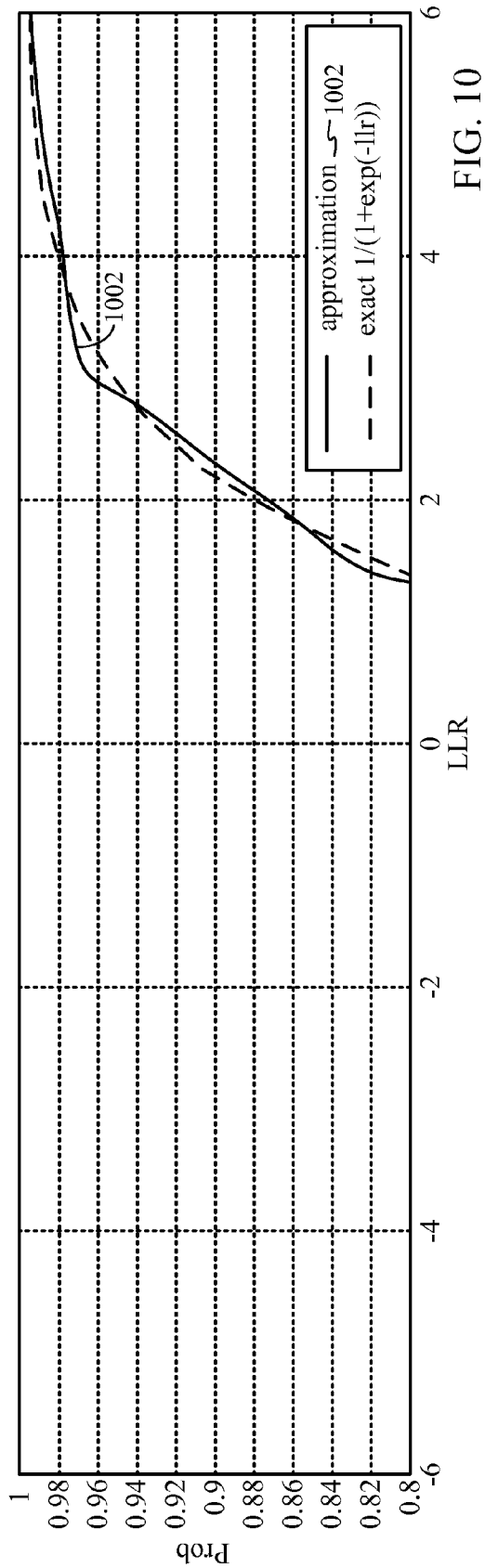
Figure 11:
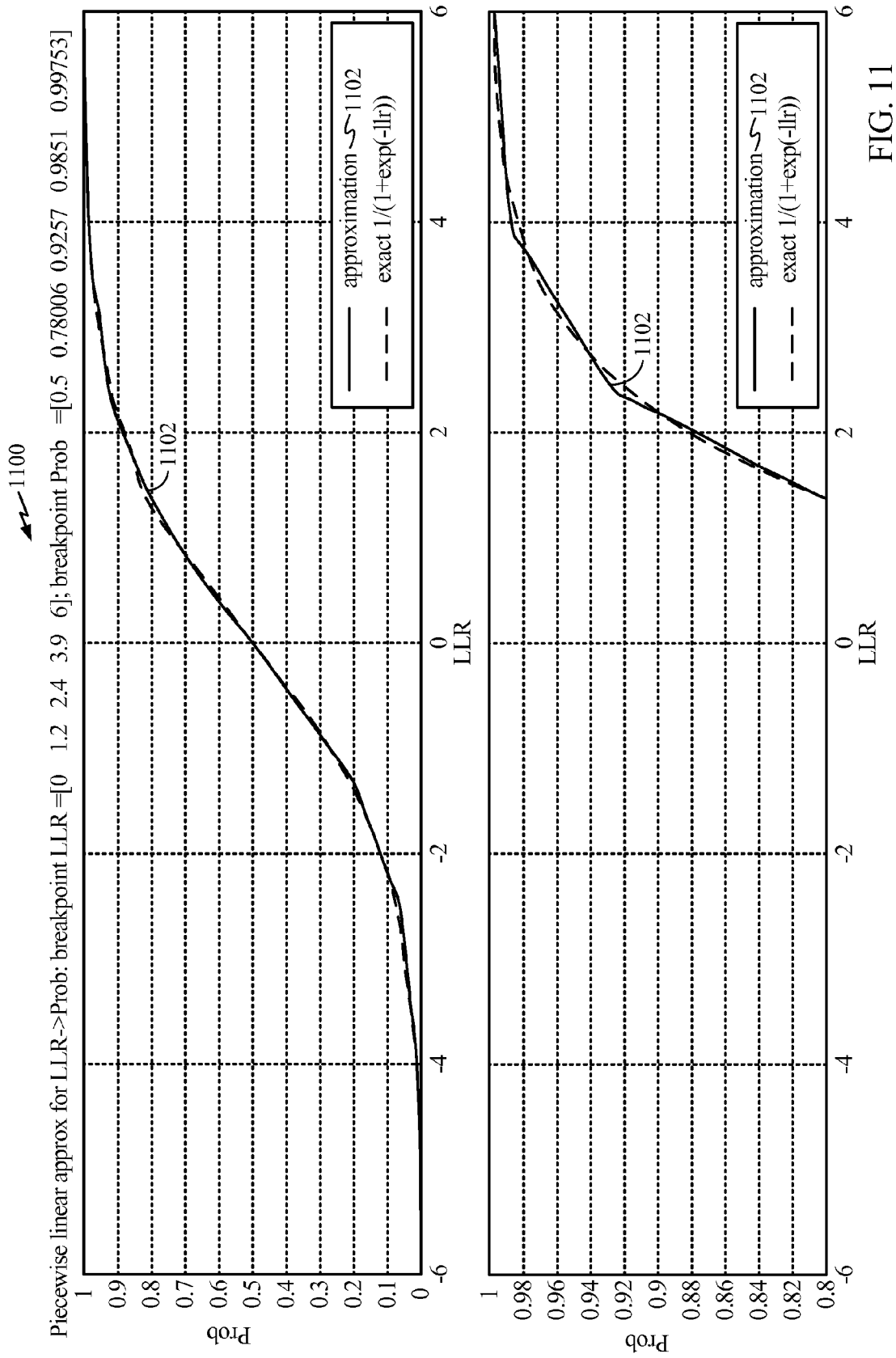
FIG. 11 illustrates another example piecewise linear approximation for converting an LLR into a bit probability in accordance with certain aspects of the present disclosure.

FIG. 10 illustrates an example 1000 of three-segment piecewise linear approximation 1002 for converting an LLR into a bit probability, and FIG. 11 illustrates an example 1100 of four-segment piecewise linear approximation 1102 for converting an LLR into a bit probability in accordance with certain aspects of the present disclosure. The LLR threshold of ±6 may be utilized in both cases. In an aspect, the LLR threshold may vary as a function of code rate and modulation order.

Probability-to-LLR Approximation

After weighted summing and combining of prior and bit probabilities associated with all candidates that may be performed by a combiner unit 424 of the receiver 400 from FIG. 4, final bit LLRs 428 may be computed by a unit 426 as:

$$llr_{final,k,l} = \log\left(\frac{p_{k,l}}{1 - p_{k,l}}\right), \quad k = 0, 1; l = 0, 1, \ldots, 5 \quad (39)$$

$$= \log(p_{k,l}) - \log(1 - p_{k,l})$$

$$= \log(2) \cdot [\log_2(p_{k,l}) - \log_2(1 - p_{k,l})]$$

In one aspect of the present disclosure, the $\log_2(x)$ function may be approximated as:

$$\log_2(x) \approx n_{floor} + \frac{x}{2^{n_{floor}}} - 1, n_{floor} = \lfloor \log_2(x) \rfloor. \quad (40)$$

In another aspect of the present disclosure, the $\log_2(x)$ function may be approximated as:

$$\log_2(x) \approx n_{ceil} + \frac{x}{2^{n_{ceil}}} - 1, n_{ceil} = \lceil \log_2(x) \rceil. \quad (41)$$

Figure 12:
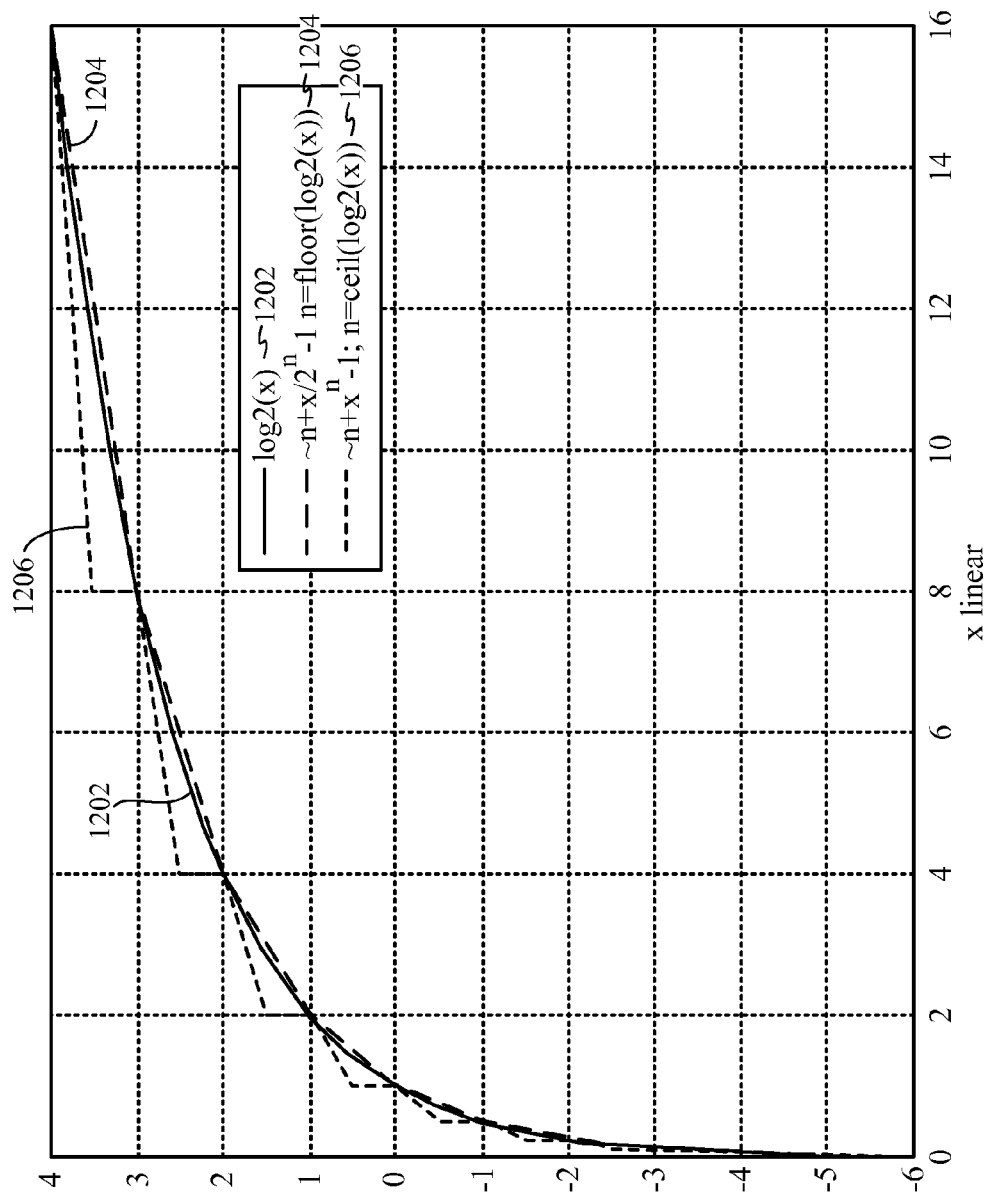
FIG. 12 illustrates an example approximation of log function used for converting a probability into an LLR in accordance with certain aspects of the present disclosure.

FIG. 12 illustrates these two options for $\log_2(x)$ approximation. It can be observed that the option defined by equation (40) gives better approximation.

By using log 2 approximation in equation (39), the final bit LLR may be obtained as:

$$llr_{final,k,l} = \log(2) \cdot [\log_2(p_{k,l}) - \log_2(1 - p_{k,l})] \quad (42)$$

$$= \log(2) \cdot \left[\lfloor \log_2(p_{k,l}) \rfloor + \frac{p_{k,l}}{2^{\lfloor \log_2(p_{k,l}) \rfloor}} - \lfloor \log_2(1 - p_{k,l}) \rfloor - \frac{1 - p_{k,l}}{2^{\lfloor \log_2(1 - p_{k,l}) \rfloor}}\right].$$

Figure 13:
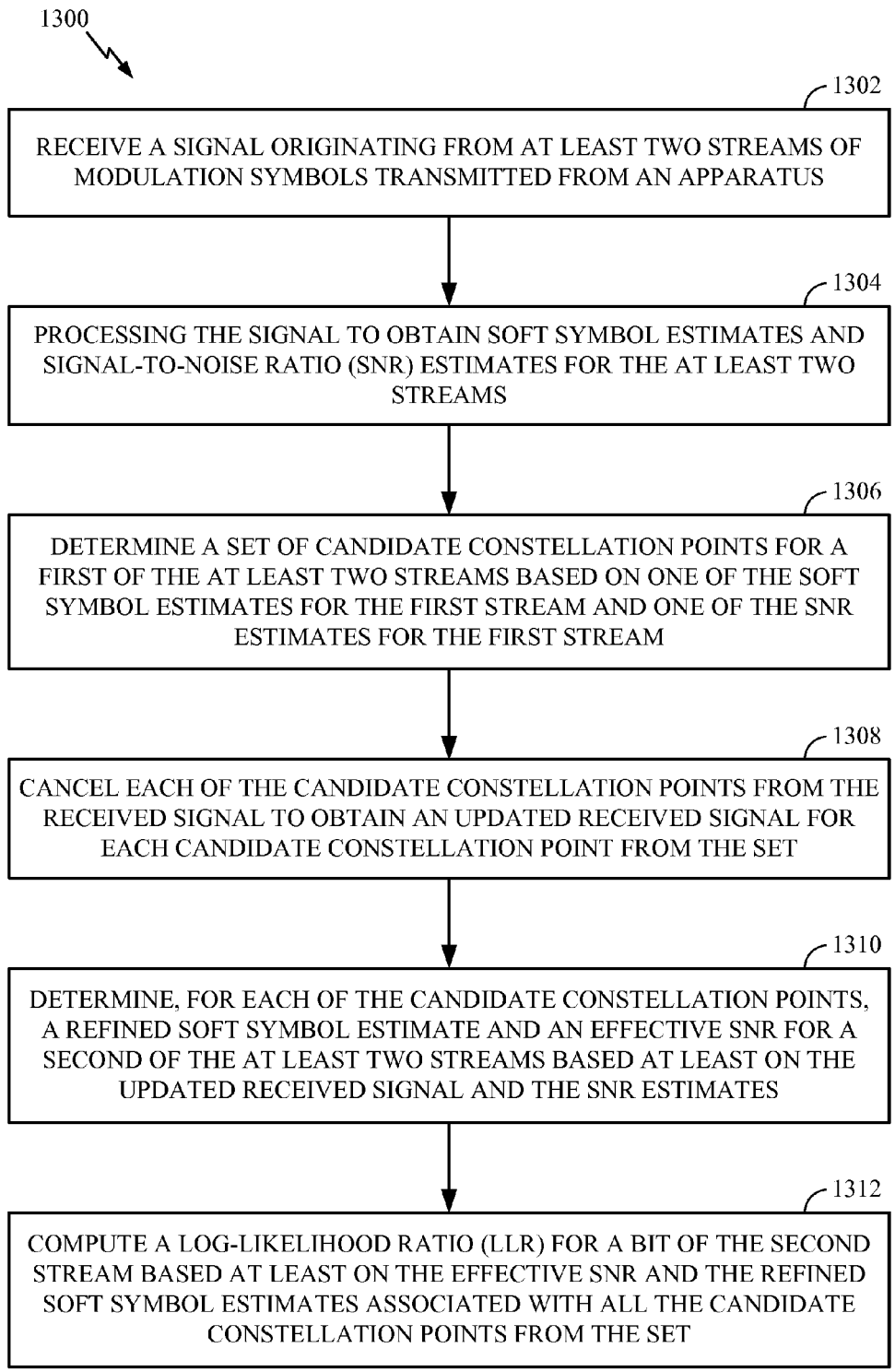
FIG. 13 is a functional block diagram conceptually illustrating example blocks that may be performed at a receiver of a wireless system in accordance with certain aspects of the present disclosure.

FIG. 13 is a functional block diagram conceptually illustrating example blocks 1300 that may be performed at a MIMO receiver in accordance with certain aspects of the present disclosure. Operations illustrated by the blocks 1200 may be executed, for example, at the processor 270 of the receiver system 250 from FIG. 2, at the processor 230 of the transmitter system 210 from FIG. 2, at the processor 304 of the wireless device 302 from FIG. 3, and/or at processing units of the receiver 400 from FIG. 4.

The operations may begin, at block 1302, by receiving a signal originating from at least two streams of modulation symbols transmitted from an apparatus. At block 1304, the signal may be processed to obtain soft symbol estimates and SNR estimates for the at least two streams. At block 1306, a set of candidate constellation points may be determined for a first of the at least two streams based on one of the soft symbol estimates for the first stream and one of the SNR estimates for the first stream. At block 1308, each of the candidate constellation points may be cancelled from the received signal to obtain an updated received signal for each candidate constellation point from the set. At block 1310, for each of the candidate constellation points, a refined soft symbol estimate and an effective SNR for a second of the at least two streams may be determined based at least on the updated received signal and the SNR estimates. At 1312, a log-likelihood ratio (LLR) for a bit of the second stream may be computed based at least on the effective SNR and the refined soft symbol estimates associated with all the candidate constellation points from the set.

According to certain aspects of the present disclosure, for each of the candidate constellation points, a prior probability and a bit probability associated with the bit of second stream (the stream of interest) may be computed based at least on the refined soft symbol estimate associated with that candidate constellation point and the effective SNR. In an aspect, the prior probability may be computed via distance-to-probability mapping performed by the unit 418 of the receiver 400 from FIG. 4, and the bit probability may be reconstructed from a scalar LLR associated with the bit of second stream, e.g., via the piecewise linear approximation performed by the unit 422 of the receiver 400. Prior probabilities and bit probabilities associated with all the candidate constellation points may be combined (e.g., by the unit 424 of the receiver 400) to obtain a probability that the bit of second stream is of a specific value. Following this, the probability may be converted (e.g., by the unit 426 of the receiver 400) into logarithmic domain to obtain the LLR for the bit of second stream.

In one configuration, the receiver system 250 for wireless communication includes means for receiving a signal originating from at least two streams of modulation symbols transmitted from the transmitter system 210, means for processing the signal to obtain soft symbol estimates and SNR estimates for the at least two streams, means for determining a set of candidate constellation points for a first of the at least two streams based on one of the soft symbol estimates for the first stream and one of the SNR estimates for the first stream, means for cancelling each of the candidate constellation points from the received signal to obtain an updated received signal for each candidate constellation point from the set, means for determining, for each of the candidate constellation points, a refined soft symbol estimate and an effective SNR for a second of the at least two streams based at least on the updated received signal and the SNR estimates, and means for computing LLR for a bit of the second stream based at least on the effective SNR and the refined soft symbol estimates associated with all the candidate constellation points from the set. In one aspect, the aforementioned means may be the processor 270 configured to perform the functions recited by the aforementioned means. In another aspect, the aforementioned means may be the receiver 400 illustrated in FIG. 4 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
    receiving a signal originating from at least two streams of modulation symbols transmitted from an apparatus;
    processing the signal to obtain soft symbol estimates and signal-to-noise ratio estimates for the at least two streams;
    determining a set of candidate constellation points for a first of the at least two streams based on one of the soft symbol estimates for the first stream and one of the signal-to-noise ratio estimates for the first stream;
    cancelling each of the candidate constellation points from the received signal to obtain an updated received signal for each candidate constellation point from the set;
    determining, for each of the candidate constellation points, a refined soft symbol estimate and an effective signal-to-noise ratio for a second of the at least two streams based at least on the updated received signal and the signal-to-noise ratio estimates; and
    computing a log-likelihood ratio for a bit of the second stream based at least on the effective signal-to-noise ratio and the refined soft symbol estimates associated with all the candidate constellation points from the set.

2. The method of claim 1, wherein computing the log-likelihood ratio comprises:
    computing, for each of the candidate constellation points, a prior probability and a bit probability associated with the bit of the second stream based at least on the refined soft symbol estimate associated with that candidate constellation point and the effective signal-to-noise ratio;
    combining the prior probabilities and the bit probabilities associated with all the candidate constellation points to obtain a probability that the bit of the second stream is of a specific value; and
    converting the probability into the log-likelihood ratio for the bit of the second stream.

3. The method of claim 2, wherein combining comprises:
    weighting, for each candidate constellation point from the set, the bit probability with the prior probability to obtain a weighted bit probability associated with the bit of the second stream and with that candidate constellation point; and
    summing the weighted bit probability associated with all the candidate constellation points from the set to obtain the probability that the bit of the second stream is of the specific value.

4. The method of claim 1, wherein processing the signal comprises:
    obtaining the soft symbol estimates for the at least two streams by applying a linear minimum mean square error based approximation to the received signal and to channel estimates associated with the at least two streams; and
    obtaining the signal-to-noise ratio estimates for the at least two streams by applying a linear minimum mean square error based approximation to the channel estimates.

5. The method of claim 4, wherein obtaining the soft symbol estimate for the first stream is performed independently of obtaining the soft symbol estimate for the second stream.

6. The method of claim 1, wherein determining the set of candidate constellation points comprises:
    searching for a defined number of constellation points with smallest Euclidian distances from the soft symbol estimate for the first stream among all constellation points associated with a modulation of the symbols transmitted from the apparatus.

7. The method of claim 1, wherein determining the set of candidate constellation points comprises:
    normalizing the soft symbol estimate for the first stream based on the signal-to-noise ratio estimate for the first stream to obtain a normalized soft symbol estimate for the first stream;
    finding a defined number of I and Q components of constellation points closest to the normalized soft symbol estimate, wherein each of the I and Q components is found independently; and
    forming the candidate constellation points in the set using the I and Q components.

8. The method of claim 2, wherein computing the prior probability for each of the candidate constellation points comprises:
    computing one or more scalar log-likelihood ratios based on the refined soft symbol estimate associated with that candidate constellation point and the effective signal-to-noise ratio, wherein the one or more scalar log-likelihood ratios are associated with one or more bits of the second stream;
    performing a hard decision on each of the scalar log-likelihood ratios to obtain a hard value for each of the one or more bits;
    mapping the hard values obtained for the one or more bits into a constellation point of a modulation of the second stream;
    computing a residual distance between the updated received signal and the constellation point multiplied with a channel estimate for the second stream; and converting the residual distance into the prior probability for that candidate constellation point.

9. The method of claim 8, wherein the refined soft symbol estimate for the second stream associated with that candidate constellation point is determined by applying maximum ratio combining to the updated received signal for that candidate constellation point.

10. The method of claim 1, wherein determining the refined soft symbol estimate for each of the candidate constellation points comprises:
applying maximum ratio combining to the updated received signal for that candidate constellation point to obtain the refined soft symbol estimate for the second stream associated with that candidate constellation point, and the method further comprising:
slicing, for each of the candidate constellation points, the refined soft symbol estimate to a closest constellation point among all constellation points associated with a modulation of the second stream to obtain a sliced symbol estimate for the second stream associated with each candidate constellation point from the set.

11. The method of claim 10, wherein computing the log-likelihood ratio comprises:
computing, for each of the candidate constellation points, a prior probability based on the sliced symbol estimate for that candidate constellation point, a channel estimate for the second stream and the updated received signal for that candidate constellation point;
computing, for each of the candidate constellation points, one or more scalar log-likelihood ratios based on the refined soft symbol estimate associated with that candidate constellation point and the effective signal-to-noise ratio; and
computing, for each of the candidate constellation points, a bit probability associated with the bit of the second stream based on one of the scalar log-likelihood ratios for that candidate constellation point.

12. The method of claim 11, further comprising:
combining the computed prior probabilities and bit probabilities associated with all the candidate constellation points to obtain a probability that the bit of the second stream is of a specific value; and
converting the probability into the log-likelihood ratio for the bit of the second stream.

13. The method of claim 11, wherein computing the prior probability for that candidate constellation point comprises:
computing a residual distance between the updated received signal and the sliced symbol estimate multiplied with the channel estimate for the second stream; and
converting the residual distance into the prior probability.

14. The method of claim 11, wherein the bit probability associated with the bit of the second stream is computed according to a piecewise linear approximation applied on that one scalar log-likelihood ratio.

15. The method of claim 1, wherein determining the effective signal-to-noise ratio for the second stream comprises:
obtaining a residual error power based on the signal-to-noise ratio estimate for the first stream; and
computing the effective signal-to-noise ratio for the second stream based on the residual error power and channel estimates associated with the at least two streams.

16. The method of claim 15, wherein obtaining the residual error power comprises:
applying a polynomial fitting with multiple coefficients to an input based on the signal-to-noise ratio estimate for the first stream.

17. The method of claim 16, wherein the coefficients of the polynomial fitting are functions of a modulation order of the second stream and a number of candidate constellation points in the set.

18. An apparatus for wireless communications, comprising:
a receiver configured to receive a signal originating from at least two streams of modulation symbols transmitted from another apparatus;
a first circuit configured to process the signal to obtain soft symbol estimates and signal-to-noise ratio estimates for the at least two streams;
a second circuit configured to determine a set of candidate constellation points for a first of the at least two streams based on one of the soft symbol estimates for the first stream and one of the signal-to-noise ratio estimates for the first stream;
a third circuit configured to cancel each of the candidate constellation points from the received signal to obtain an updated received signal for each candidate constellation point from the set;
a fourth circuit configured to determine, for each of the candidate constellation points, a refined soft symbol estimate and an effective signal-to-noise ratio for a second of the at least two streams based at least on the updated received signal and the signal-to-noise ratio estimates; and
a fifth circuit configured to compute a log-likelihood ratio for a bit of the second stream based at least on the effective signal-to-noise ratio and the refined soft symbol estimates associated with all the candidate constellation points from the set.

19. The apparatus of claim 18, wherein the fifth circuit is also configured to:
compute, for each of the candidate constellation points, a prior probability and a bit probability associated with the bit of the second stream based at least on the refined soft symbol estimate associated with that candidate constellation point and the effective signal-to-noise ratio;
combine the prior probabilities and the bit probabilities associated with all the candidate constellation points to obtain a probability that the bit of the second stream is of a specific value; and
convert the probability into the log-likelihood ratio for the bit of the second stream.

20. The apparatus of claim 19, further comprising:
a circuit configured to weight, for each candidate constellation point from the set, the bit probability with the prior probability to obtain a weighted bit probability associated with the bit of the second stream and with that candidate constellation point; and
another circuit configured to sum the weighted bit probability associated with all the candidate constellation points from the set to obtain the probability that the bit of the second stream is of the specific value.

21. The apparatus of claim 18, wherein the first circuit is also configured to:
obtain the soft symbol estimates for the at least two streams by applying a linear minimum mean square error based approximation to the received signal and to channel estimates associated with the at least two streams; and
obtain the signal-to-noise ratio estimates for the at least two streams by applying a linear minimum mean square error based approximation to the channel estimates.

22. The apparatus of claim 21, wherein obtaining the soft symbol estimate for the first stream is performed independently of obtaining the soft symbol estimate for the second stream.

23. The apparatus of claim 18, wherein the second circuit is also configured to:
search for a defined number of constellation points with smallest Euclidian distances from the soft symbol estimate for the first stream among all constellation points associated with a modulation of the symbols transmitted from the other apparatus.

24. The apparatus of claim 18, wherein the second circuit is also configured to:
normalize the soft symbol estimate for the first stream based on the signal-to-noise ratio estimate for the first stream to obtain a normalized soft symbol estimate for the first stream;
find a defined number of I and Q components of constellation points closest to the normalized soft symbol estimate, wherein each of the I and Q components is found independently; and
form the candidate constellation points in the set using the I and Q components.

25. The apparatus of claim 19, wherein the fifth circuit is also configured to:
compute one or more scalar log-likelihood ratios based on the refined soft symbol estimate associated with that candidate constellation point and the effective signal-to-noise ratio, wherein the one or more scalar log-likelihood ratios are associated with one or more bits of the second stream;
perform hard decision on each of the scalar log-likelihood ratios to obtain a hard value for each of the one or more bits;
map the hard values obtained for the one or more bits into a constellation point of a modulation of the second stream;
compute a residual distance between the updated received signal and the constellation point multiplied with a channel estimate for the second stream; and
convert the residual distance into the prior probability for that candidate constellation point.

26. The apparatus of claim 25, wherein the refined soft symbol estimate for the second stream associated with that candidate constellation point is determined by applying maximum ratio combining to the updated received signal for that candidate constellation point.

27. The apparatus of claim 18, wherein the fourth circuit is also configured to:
apply maximum ratio combining to the updated received signal for that candidate constellation point to obtain the refined soft symbol estimate for the second stream associated with that candidate constellation point, and the apparatus further comprising:
a circuit configured to slice, for each of the candidate constellation points, the refined soft symbol estimate to a closest constellation point among all constellation points associated with a modulation of the second stream to obtain a sliced symbol estimate for the second stream associated with each candidate constellation point from the set.

28. The apparatus of claim 27, wherein the fifth circuit is also configured to:
compute, for each of the candidate constellation points, a prior probability based on the sliced symbol estimate for that candidate constellation point, a channel estimate for the second stream and the updated received signal for that candidate constellation point;
compute, for each of the candidate constellation points, one or more scalar log-likelihood ratios based on the refined soft symbol estimate associated with that candidate constellation point and the effective signal-to-noise ratio; and
compute, for each of the candidate constellation points, a bit probability associated with the bit of the second stream based on one of the scalar log-likelihood ratios for that candidate constellation point.

29. The apparatus of claim 28, further comprising:
a sixth circuit configured to combine the computed prior probabilities and bit probabilities associated with all the candidate constellation points to obtain a probability that the bit of the second stream is of a specific value; and
a seventh circuit configured to convert the probability into the log-likelihood ratio for the bit of the second stream.

30. The apparatus of claim 28, wherein the fifth circuit is also configured to:
compute a residual distance between the updated received signal and the sliced symbol estimate multiplied with the channel estimate for the second stream; and
convert the residual distance into the prior probability.

31. The apparatus of claim 28, wherein the bit probability associated with the bit of the second stream is computed according to a piecewise linear approximation applied on that one scalar log-likelihood ratio.

32. The apparatus of claim 18, wherein the fourth circuit is also configured to:
obtain a residual error power based on the signal-to-noise ratio estimate for the first stream; and
compute the effective signal-to-noise ratio for the second stream based on the residual error power and channel estimates associated with the at least two streams.

33. The apparatus of claim 32, wherein obtaining the residual error power comprises:
applying a polynomial fitting with multiple coefficients to an input based on the signal-to-noise ratio estimate for the first stream.

34. The apparatus of claim 33, wherein the coefficients of the polynomial fitting are functions of a modulation order of the second stream and a number of candidate constellation points in the set.

35. An apparatus for wireless communications, comprising:
means for receiving a signal originating from at least two streams of modulation symbols transmitted from another apparatus;
means for processing the signal to obtain soft symbol estimates and signal-to-noise ratio estimates for the at least two streams;
means for determining a set of candidate constellation points for a first of the at least two streams based on one of the soft symbol estimates for the first stream and one of the signal-to-noise ratio estimates for the first stream;
means for cancelling each of the candidate constellation points from the received signal to obtain an updated received signal for each candidate constellation point from the set;
means for determining, for each of the candidate constellation points, a refined soft symbol estimate and an effective signal-to-noise ratio for a second of the at least two streams based at least on the updated received signal and the signal-to-noise ratio estimates; and
means for computing a log-likelihood ratio for a bit of the second stream based at least on the effective signal-tonoise ratio and the refined soft symbol estimates associated with all the candidate constellation points from the set.

36. The apparatus of claim 35, wherein the means for computing the log-likelihood ratio LLR comprises:
   means for computing, for each of the candidate constellation points, a prior probability and a bit probability associated with the bit of the second stream based at least on the refined soft symbol estimate associated with that candidate constellation point and the effective signal-to-noise ratio;
   means for combining the prior probabilities and the bit probabilities associated with all the candidate constellation points to obtain a probability that the bit of the second stream is of a specific value; and
   means for converting the probability into the log-likelihood ratio for the bit of the second stream.

37. The apparatus of claim 36, wherein the means for combining comprises:
   means for weighting, for each candidate constellation point from the set, the bit probability with the prior probability to obtain a weighted bit probability associated with the bit of the second stream and with that candidate constellation point; and
   means for summing the weighted bit probability associated with all the candidate constellation points from the set to obtain the probability that the bit of the second stream is of the specific value.

38. The apparatus of claim 35, wherein the means for processing the signal comprises:
   means for obtaining the soft symbol estimates for the at least two streams by applying a linear minimum mean square error based approximation to the received signal and to channel estimates associated with the at least two streams; and
   means for obtaining the signal-to-noise ratio estimates for the at least two streams by applying a linear minimum mean square error based approximation to the channel estimates.

39. The apparatus of claim 38, wherein obtaining the soft symbol estimate for the first stream is performed independently of obtaining the soft symbol estimate for the second stream.

40. The apparatus of claim 35, wherein the means for determining the set of candidate constellation points comprises:
   means for searching for a defined number of constellation points with smallest Euclidian distances from the soft symbol estimate for the first stream among all constellation points associated with a modulation of the symbols transmitted from the other apparatus.

41. The apparatus of claim 35, wherein the means for determining the set of candidate constellation points comprises:
   means for normalizing the soft symbol estimate for the first stream based on the signal-to-noise ratio estimate for the first stream to obtain a normalized soft symbol estimate for the first stream;
   means for finding a defined number of I and Q components of constellation points closest to the normalized soft symbol estimate, wherein each of the I and Q components is found independently; and
   means for forming the candidate constellation points in the set using the I and Q components.

42. The apparatus of claim 36, wherein the means for computing the prior probability for each of the candidate constellation points comprises:
   means for computing one or more scalar log-likelihood ratios based on the refined soft symbol estimate associated with that candidate constellation point and the effective signal-to-noise ratio, wherein the one or more scalar log-likelihood ratios are associated with one or more bits of the second stream;
   means for performing a hard decision on each of the scalar log-likelihood ratios to obtain a hard value for each of the one or more bits;
   means for mapping the hard values obtained for the one or more bits into a constellation point of a modulation of the second stream;
   means for computing a residual distance between the updated received signal and the constellation point multiplied with a channel estimate for the second stream; and
   means for converting the residual distance into the prior probability for that candidate constellation point.

43. The apparatus of claim 42, wherein the refined soft symbol estimate for the second stream associated with that candidate constellation point is determined by applying maximum ratio combining to the updated received signal for that candidate constellation point.

44. The apparatus of claim 35, wherein the means for determining the refined soft symbol estimate for each of the candidate constellation points comprises:
   means for applying maximum ratio combining to the updated received signal for that candidate constellation point to obtain the refined soft symbol estimate for the second stream associated with that candidate constellation point, and the apparatus further comprising:
   means for slicing, for each of the candidate constellation points, the refined soft symbol estimate to a closest constellation point among all constellation points associated with a modulation of the second stream to obtain a sliced symbol estimate for the second stream associated with each candidate constellation point from the set.

45. The apparatus of claim 44, wherein the means for computing the log-likelihood ratio comprises:
   means for computing, for each of the candidate constellation points, a prior probability based on the sliced symbol estimate for that candidate constellation point, a channel estimate for the second stream and the updated received signal for that candidate constellation point;
   means for computing, for each of the candidate constellation points, one or more scalar log-likelihood ratios based on the refined soft symbol estimate associated with that candidate constellation point and the effective signal-to-noise ratio; and
   means for computing, for each of the candidate constellation points, a bit probability associated with the bit of the second stream based on one of the scalar log-likelihood ratios for that candidate constellation point.

46. The apparatus of claim 45, further comprising:
   means for combining the computed prior probabilities and bit probabilities associated with all the candidate constellation points to obtain a probability that the bit of the second stream is of a specific value; and
   means for converting the probability into the log-likelihood ratio for the bit of the second stream.

47. The apparatus of claim 45, wherein the means for computing the prior probability for that candidate constellation point comprises:
   means for computing a residual distance between the updated received signal and the sliced symbol estimate multiplied with the channel estimate for the second stream; and means for converting the residual distance into the prior probability.

48. The apparatus of claim 45, wherein the bit probability associated with the bit of the second stream is computed according to a piecewise linear approximation applied on that one scalar log-likelihood ratio.

49. The apparatus of claim 35, wherein the means for determining the effective signal-to-noise ratio for the second stream comprises:
means for obtaining a residual error power based on the signal-to-noise ratio estimate for the first stream; and
means for computing the effective signal-to-noise ratio for the second stream based on the residual error power and channel estimates associated with the at least two streams.

50. The apparatus of claim 49, wherein the means for obtaining the residual error power comprises:
means for applying a polynomial fitting with multiple coefficients to an input based on the signal-to-noise ratio estimate for the first stream.

51. The apparatus of claim 50, wherein the coefficients of the polynomial fitting are functions of a modulation order of the second stream and a number of candidate constellation points in the set.

52. A computer program product for wireless communications, comprising a non-transitory computer-readable storage medium comprising code stored thereon for:
receiving a signal originating from at least two streams of modulation symbols transmitted from an apparatus;
processing the signal to obtain soft symbol estimates and signal-to-noise ratio estimates for the at least two streams;
determining a set of candidate constellation points for a first of the at least two streams based on one of the soft symbol estimates for the first stream and one of the signal-to-noise ratio estimates for the first stream;
cancelling each of the candidate constellation points from the received signal to obtain an updated received signal for each candidate constellation point from the set;
determining, for each of the candidate constellation points, a refined soft symbol estimate and an effective signal-to-noise ratio for a second of the at least two streams based at least on the updated received signal and the signal-to-noise ratio estimates; and
computing a log-likelihood ratio for a bit of the second stream based at least on the effective signal-to-noise ratio and the refined soft symbol estimates associated with all the candidate constellation points from the set.

53. The computer program product of claim 52, wherein the non-transitory computer-readable storage medium further comprises code stored thereon for:
computing, for each of the candidate constellation points, a prior probability and a bit probability associated with the bit of the second stream based at least on the refined soft symbol estimate associated with that candidate constellation point and the effective signal-to-noise ratio;
combining the prior probabilities and the bit probabilities associated with all the candidate constellation points to obtain a probability that the bit of the second stream is of a specific value; and
converting the probability into the log-likelihood ratio for the bit of the second stream.

54. The computer program product of claim 53, wherein the non-transitory computer-readable storage medium further comprises code stored thereon for:
weighting, for each candidate constellation point from the set, the bit probability with the prior probability to obtain a weighted bit probability associated with the bit of the second stream and with that candidate constellation point; and
summing the weighted bit probability associated with all the candidate constellation points from the set to obtain the probability that the bit of the second stream is of the specific value.

55. The computer program product of claim 52, wherein the non-transitory computer-readable storage medium further comprises code stored thereon for:
obtaining the soft symbol estimates for the at least two streams by applying a linear minimum mean square error based approximation to the received signal and to channel estimates associated with the at least two streams; and
obtaining the signal-to-noise ratio estimates for the at least two streams by applying a linear minimum mean square error based approximation to the channel estimates.

56. The computer program product of claim 55, wherein obtaining the soft symbol estimate for the first stream is performed independently of obtaining the soft symbol estimate for the second stream.

57. The computer program product of claim 52, wherein the non-transitory computer-readable storage medium further comprises code stored thereon for:
searching for a defined number of constellation points with smallest Euclidian distances from the soft symbol estimate for the first stream among all constellation points associated with a modulation of the symbols transmitted from the apparatus.

58. The computer program product of claim 52, wherein the non-transitory computer-readable stored medium further comprises code stored thereon for:
normalizing the soft symbol estimate for the first stream based on the signal-to-noise ratio estimate for the first stream to obtain a normalized soft symbol estimate for the first stream;
finding a defined number of I and Q components of constellation points closest to the normalized soft symbol estimate, wherein each of the I and Q components is found independently; and
forming the candidate constellation points in the set using the I and Q components.

59. The computer program product of claim 53, wherein the non-transitory computer-readable storage medium further comprises code stored thereon for:
computing one or more scalar log-likelihood ratios LLRs based on the refined soft symbol estimate associated with that candidate constellation point and the effective signal-to-noise ratio, wherein the one or more scalar log-likelihood ratios are associated with one or more bits of the second stream;
performing a hard decision on each of the scalar log-likelihood ratios to obtain a hard value for each of the one or more bits;
mapping the hard values obtained for the one or more bits into a constellation point of a modulation of the second stream;
computing a residual distance between the updated received signal and the constellation point multiplied with a channel estimate for the second stream; and
converting the residual distance into the prior probability for that candidate constellation point.

60. The computer program product of claim 59, wherein the refined soft symbol estimate for the second stream associated with that candidate constellation point is determined by applying maximum ratio combining to the updated received signal for that candidate constellation point.

61. The computer program product of claim 52, wherein the non-transitory computer-readable storage medium further comprises code stored thereon for:
applying maximum ratio combining to the updated received signal for that candidate constellation point to obtain the refined soft symbol estimate for the second stream associated with that candidate constellation point; and
slicing, for each of the candidate constellation points, the refined soft symbol estimate to a closest constellation point among all constellation points associated with a modulation of the second stream to obtain a sliced symbol estimate for the second stream associated with each candidate constellation point from the set.

62. The computer program product of claim 61, wherein the non-transitory computer-readable storage medium further comprises code stored thereon for:
computing, for each of the candidate constellation points, a prior probability based on the sliced symbol estimate for that candidate constellation point, a channel estimate for the second stream and the updated received signal for that candidate constellation point;
computing, for each of the candidate constellation points, one or more scalar log-likelihood ratios based on the refined soft symbol estimate associated with that candidate constellation point and the effective signal-to-noise ratio; and
computing, for each of the candidate constellation points, a bit probability associated with the bit of the second stream based on one of the scalar log-likelihood ratios for that candidate constellation point.

63. The computer program product of claim 62, wherein the non-transitory computer-readable storage medium further comprises code stored thereon for:
combining the computed prior probabilities and bit probabilities associated with all the candidate constellation points to obtain a probability that the bit of the second stream is of a specific value; and
converting the probability into the log-likelihood ratio for the bit of the second stream.

64. The computer program product of claim 62, wherein the non-transitory computer-readable storage medium further comprises code stored thereon for:
computing a residual distance between the updated received signal and the sliced symbol estimate multiplied with the channel estimate for the second stream; and
converting the residual distance into the prior probability.

65. The computer program product of claim 62, wherein the bit probability associated with the bit of the second stream is computed according to a piecewise linear approximation applied on that one scalar log-likelihood ratio.

66. The computer program product of claim 52, wherein the non-transitory computer-readable storage medium further comprises code stored thereon for:
obtaining a residual error power based on the signal-to-noise ratio estimate for the first stream; and
computing the effective signal-to-noise ratio for the second stream based on the residual error power and channel estimates associated with the at least two streams.

67. The computer program product of claim 66, wherein the non-transitory computer-readable storage medium further comprises code stored thereon for:
applying a polynomial fitting with multiple coefficients to an input based on the signal-to-noise ratio estimate for the first stream.

68. The computer program product of claim 67, wherein the coefficients of the polynomial fitting are functions of a modulation order of the second stream and a number of candidate constellation points in the set.

* * * * *